US010762457B2

(12) United States Patent
Grant et al.

(10) Patent No.: US 10,762,457 B2
(45) Date of Patent: *Sep. 1, 2020

(54) SIMULTANEOUS OPERATIONS COORDINATION AND PLANNING SYSTEM

(71) Applicant: ION Geophysical Corporation, Houston, TX (US)

(72) Inventors: John Grant, Livingston (GB); Stuart Darling, Glasgow (GB); Scott Cameron, Edinburgh (GB); Dave Gentle, Edinburgh (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/411,451

(22) Filed: May 14, 2019

(65) Prior Publication Data

US 2019/0392364 A1 Dec. 26, 2019

Related U.S. Application Data

(63) Continuation of application No. 14/578,135, filed on Dec. 19, 2014, now Pat. No. 10,339,478.

(Continued)

(51) Int. Cl.
*G06Q 10/06* (2012.01)
*E21B 41/00* (2006.01)
(Continued)

(52) U.S. Cl.
CPC ... *G06Q 10/06313* (2013.01); *E21B 41/0092* (2013.01); *G06Q 10/06* (2013.01);
(Continued)

(58) Field of Classification Search
CPC .................................................. G06Q 10/06
(Continued)

(56) References Cited

U.S. PATENT DOCUMENTS 10,339,478 B2 * 7/2019 Grant ..................... G06Q 10/06
2009/0024442 A1 * 1/2009 Brink ............... G06Q 10/06315
705/7.16

(Continued)

FOREIGN PATENT DOCUMENTS

CN 202257669 U 5/2012
WO 2012162310 A1 11/2012

OTHER PUBLICATIONS

Third Office Action in counterpart DK Appl. PA201670838, dated Apr. 11, 2019, 6-pgs.

(Continued)

*Primary Examiner* — Nga B Nguyen

(57) ABSTRACT

A networked system shares operational information (tasks, positions, times, etc.) between dissimilar operators performing dissimilar operations in a same marine field. The shared information include associations (linkages and conflicts) that allows each operator to optimize its operations and complete tasks in a more efficient manner. As part of this system, a planning tool having a graphical user interface can be used to visualize plans at an operator (and nearby operators). Changes made to plans by one operator are shared with other operators via the system and illustrated in the interface at the other operators, thereby allowing the other operators to make their own respective operational changes in response.

20 Claims, 12 Drawing Sheets

Related U.S. Application Data

(60) Provisional application No. 61/970,825, filed on Mar. 26, 2014.

(51) Int. Cl.
*G06Q 50/06* (2012.01)
*G06Q 50/02* (2012.01)
*H04L 29/08* (2006.01)
*G08G 3/02* (2006.01)
*G08G 3/00* (2006.01)

(52) U.S. Cl.
CPC ............. *G06Q 50/02* (2013.01); *G06Q 50/06* (2013.01); *G08G 3/02* (2013.01); *H04L 67/12* (2013.01); *G08G 3/00* (2013.01)

(58) Field of Classification Search
USPC ........................................................ 705/7.23
See application file for complete search history.

(56) References Cited

U.S. PATENT DOCUMENTS

| | | | |
|---|---|---|---|
| 2009/0024443 A1* | 1/2009 | Graham | G06Q 10/06315 705/7.16 |
| 2009/0254569 A1* | 10/2009 | Paulk | G06Q 10/06 |
| 2014/0006074 A1* | 1/2014 | Cockburn | E02F 9/2054 705/7.11 |
| 2014/0025413 A1* | 1/2014 | Yeager | G06Q 10/0631 705/7.12 |
| 2015/0218928 A1* | 8/2015 | Suvanen | E21B 43/30 700/275 |
| 2015/0262095 A1* | 9/2015 | Rajasekaran | G06Q 10/0635 705/7.28 |

OTHER PUBLICATIONS

First Office Action in counterpart MX Appl. 63135, dated Aug. 2, 2019, 6-pgs.
First Office Action in counterpart CN Appl. CN201120313473U, dated Jul. 19, 2019, 21-pgs.

* cited by examiner

SIMULTANEOUS OPERATIONS COORDINATION AND PLANNING SYSTEM

CROSS-REFERENCE TO RELATED APPLICATIONS

This application is a continuation of U.S. application Ser. No. 14/578,135 filed 19 Dec. 2014, which claims the benefit of U.S. Prov. Appl. 61/970,825, filed 26 Mar. 2014, and entitled "Graphical User Interface for Operations Planning," which are both incorporated herein by reference.

TECHNICAL FIELD

This disclosure relates generally to operations planning, and more particularly to a network system and graphical user interfaces to assist with planning of exploration, drilling, and production operations for various marine operators in an oil and gas marine field.

BACKGROUND OF THE DISCLOSURE

Situational awareness can be a significant requirement in the management of operations, such as aviation, air traffic control, ship navigation, power plant operations, military command and control, emergency services such as firefighting and policing, self-driving automobiles and bicycles, and the like. Situational awareness is generally defined as the perception of environmental elements with respect to time and/or space, the comprehension of their meaning, and the projection of their status after some variable has changed, such as time, or some other variable, such as a predetermined event. It is also a field of study concerned with perception of the environment critical to decision-makers in complex, dynamic areas such as the ones listed above.

Situational awareness involves being aware of what is happening in the vicinity, in order to understand how information, events, and one's own actions will impact goals and objectives, both immediately and in the near future. One with an adept sense of situation awareness generally has a high degree of knowledge with respect to inputs and outputs of a system, i.e. an innate "feel" for situations, people, and events that play out due to variables the subject can control. Lacking or inadequate situational awareness has been identified as one of the primary factors in accidents attributed to human error. Thus, situational awareness is especially important in work domains where the information flow can be quite high and poor decisions may lead to serious consequences.

In truth, only limited situational awareness is available through scheduling tools or Gantt charts, communications, and collaboration among people assigned tasks related to a project. In fact, there is generally no common view or picture of the situation in the field; spatial awareness is also limited or non-existent. Additionally, efficiency is purposefully sacrificed so operations can avoid issues.

An oil and gas marine field may have several operators (installations, structures, vessels, resources, entities, etc.) that may be operating in the area either together or merely at the same time. For example, the marine field may have one or more platform complexes, floating storage units (FSOs), platform supply vessels, support vessels for the FSOs, inter-field vessels (used for basket transfer and ad hoc requirements), accommodation vessels, drilling rigs in field, barges, helicopter flights, well service vessels, multipurpose vessels for ROV and diving, seismic vessel, etc. The logistics involved in the operations, timing, and interaction of these various entities can be very complex and congested, especially in light of the necessary considerations of health, safety, and environment.

The logistics involved in the operations, timing, and interaction of these various operators can be further complication by the expansion of oil and gas production operations in new regions, such as the Arctic. This increasing activity makes it more likely that fixed or floating production platforms, drill ships, other structures, support vessels, survey vessels, etc. will be used in these regions to perform various types of marine operations.

A concern for marine operations in such regions is potential for damage caused by objects that are uncontrolled and floating or submerged in the water, such as flotsam, jetsam, debris, icebergs, ice floes, and other threats ("marine obstacles"). In icy regions, for example, large icebergs and strong ice floes can pass through survey, production, and drilling areas. Weather conditions may also pose threats to operators and their operations. Although vessels, structures, and the like may be designed to handle some impacts from such marine obstacles and weather conditions, they may have limits on how long impacts can be sustained and what force of potential impacts can be handled safely.

For these reasons, the desire is to have improved sharing and visualization in such a complex marine field having multiple operators performing various operations. To that end, the subject matter of the present disclosure is directed to overcoming, or at least reducing the effects of, one or more of the problems set forth above.

SUMMARY OF THE DISCLOSURE

A networked system is disclosed herein for sharing data between multiple installations, structures, vessels, or other resources (i.e., operators or entities) that may be operating in a marine environment, such as an oil and gas marine field. The data shared between the operators allows each operator to optimize its operations and complete tasks in a more efficient manner. The marine operation can include seismic operation, drilling operation, vessel operation (e.g., tanker, support vessel, chase vessel, fishing vessel), diving operation, anchoring operation, rig operation, maintenance operation, surveillance operation, etc. Each of these marine operations have various operational plans associated with them that call for a number of tasks to be performed and positions in the area to be traversed, closed off, traveled, etc. at different times. The operational plans can therefore involve task information related to the particular tasks to be conducted and can involve positioning and timing information related to the particular tasks in the area. What the particular information will be depends on what marine operation is planned to be performed and which operators will be performing them.

As part of this networked system, a planning tool having a graphical user interface can be used to visualize tasks at an operator (and nearby operators). Changes made to tasks by one operator are shared with other operators via the networked system and illustrated in the interface at the other operators, therefore allowing the other operators to make their own respective operational changes in response.

The foregoing summary is not intended to summarize each potential embodiment or every aspect of the present disclosure.

DETAILED DESCRIPTION

A. Overview of Coordination System

Figure 1:
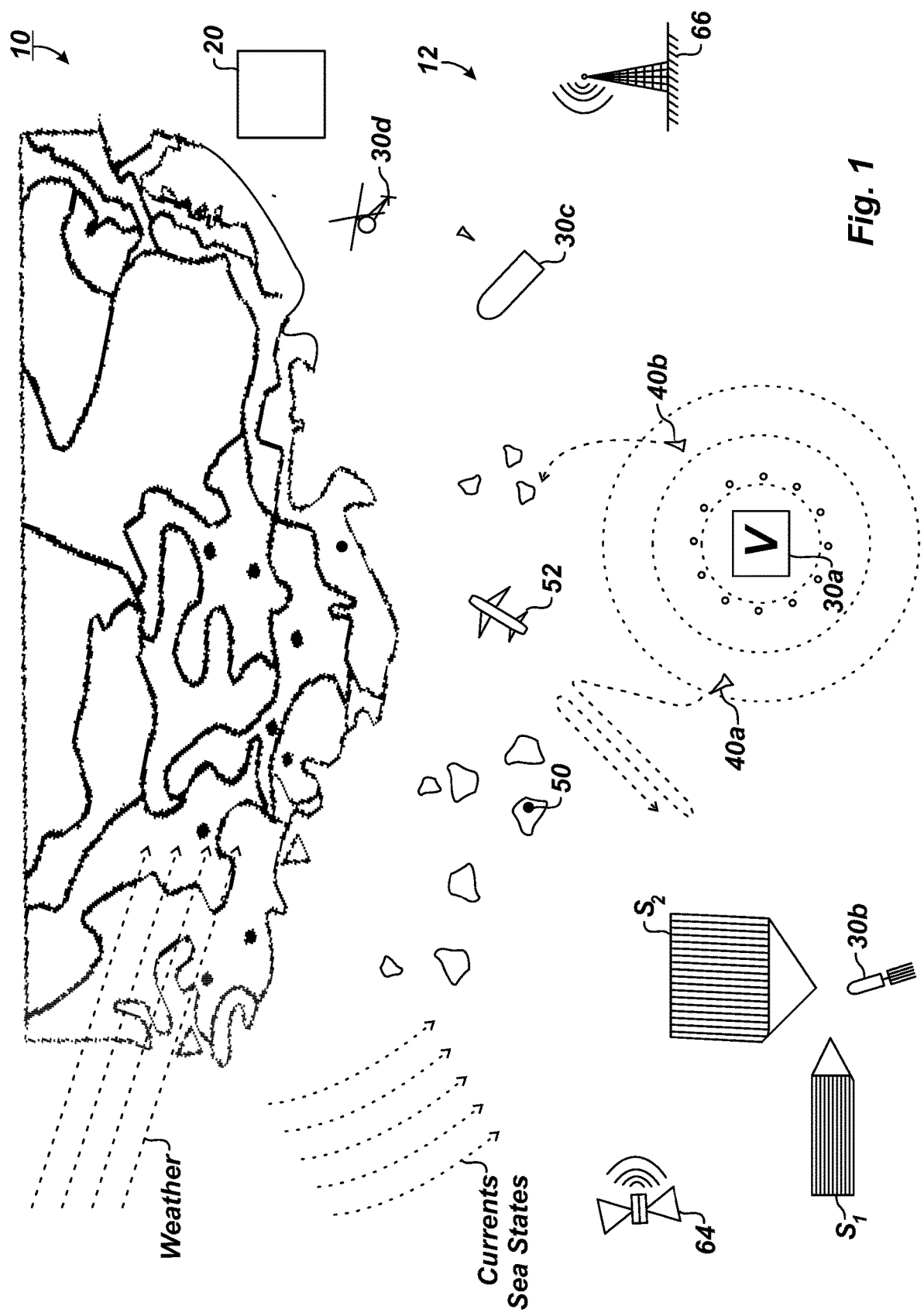
FIG. 1 schematically shows a marine operation coordination system according to the present disclosure for a marine field.

FIG. 1 schematically shows a marine operation coordination system 10 according to the present disclosure for a marine field 12. As noted above, operations surrounding the exploration, appraisal, development and production of an offshore asset are complex. Some of the operations occur simultaneously and may include seismic acquisition, construction, production, rig operations, mobilization/demobilization, diving, aircraft landing and takeoff, anchoring operations, and more.

To achieve the desired objectives, operators 30 need "situational awareness." Using the disclosed coordination system 10, operators 30 can understand the current situation including operational constraints or conflicts, awareness of future plans, including operational constraints or conflicts, and perception of the future state of operations in the marine field 12. As noted above, the marine field 12 may involve several operators 30 performing different and dissimilar operations overtime. At the same time, the operators 30 and their operations are subject to changing operational conditions, environmental conditions, marine obstacles, threats, changes in the operators' plans, and the like. Therefore, the operators 30 (e.g., production vessel, marine structure, support vessel, seismic vessel, etc.) need to coordinate their operational plans, anticipate conflicts or issues, and defend against threats from obstacles, weather, and other conditions so all of the various marine operations can be efficiently completed in the marine field 12 and the vessels, structures, etc. can be sufficiently protected. If conditions become too conflicted, for example, operators 30 may need to suspend operations. If threats become too dangerous, operators 30 may need to move a vessel, structure, etc. away until it is safe to return to normal operations. Being able to avoid problems or to handle them reliably can be of utmost importance to the operators 30.

For these reasons, the system 10 coordinates (e.g., simultaneously monitors and manages) the simultaneous marine operations being performed in the marine field 12. The system 10 is a distributed system located both remotely at a host service 20 and locally at the operators 30 (i.e., on infield FSO's, seismic survey vessels, infield vessels, onshore office locations, etc.). In this distributed arrangement, the system 10 uses a data hosting, visualization, and communications infrastructure to provide greater situational awareness for the operators 30 across the marine field 12 during the different and dissimilar operations.

As noted previously, monitoring marine operations of operators 30 presents a significant challenge to drilling, production, and exploration operations in the marine field 12. Moreover, protecting such operators 30 and their operations from one another and from marine obstacles and impacts presents a significant challenge in some marine regions, such as the Arctic. To meet these challenges, operators 30 use the networked system 10 for sharing data between the multiple operators 30 that are operating in the same marine field 12. The data shared between the operators 30 allows each operator 30 to optimize its operations and complete tasks in a more efficient manner.

In general, the marine field 12 can be an oil and gas field for exploration, completion, and production of a reservoir. In this context, the dissimilar marine operators 30 can include installations, structures, vessels, entities, and the like, such as a production vessel, a production platform, a drilling ship, a wellhead, a riser, a fixed offshore structures, a floating storage unit, a supply vessel, a support vessel, an inter-field vessel, an accommodation vessel, a drilling rig, a barge, a helicopter, a well service vessel, a seismic survey vessel, a remotely operated vehicle, a multipurpose vessel for ROV and diving, a tanker, an office installation, or any other structure, installation, or entity involved in drilling, production, or exploration operations at sea. For such operators 30, the operations in the marine field 12 can be dissimilar and independent in nature and can include a seismic survey operation, a drilling operation, a vessel (e.g., tanker, support vessel, chase vessel, fishing vessel, etc.) operation, a diving operation, an anchoring operation, a rig operation, a maintenance operation, etc.

As depicted in FIG. 1, for example, various operators 30 in the marine field 12 can include a platform 30a, a seismic vessel 30b, a floating storage unit 30c, a transportation flight 30d, etc. Other operators 30, such as support vessels 40a-b, can also be used in the marine field 12 for various purposes to support main operators 30, for example, by performing ice management or other support operations.

As can be seen, the operators 30 can be floating or fixed and can be permanently or temporarily affixed to the sea floor. Therefore, the operators 30 can be stationed (i.e., "set") for operations (e.g., exploration, drilling, tanker loading, well workover, subsea maintenance, or other operations in a body of water). For exploration, the operators, such as the seismic vessel 30b, can traverse an area of exploration with a planned (i.e., "set") route for seismic acquisition or other such exploration operation. For example, seismic acquisition plans $S_1$ and $S_2$ are depicted in FIG. 1.

In any event, the various operators 30 typically operate in one specific location for a period of time to perform their operations, which not only makes them vulnerable to moving threats from marine obstacles in the water, but makes the various operators 30 and their operations potentially conflict, interfere, associate, link, etc. with other operators 30 and operations in the same marine field 12. In other words, the dissimilar operators 30 and their dissimilar operations operating in the same field 12 are prone to various conflicts, interferences, associations, linkages, threats, etc. between one another and other elements (e.g., weather conditions, unauthorized vessels, mammal pods, ice threats, etc.). This is especially true since all of the various operators 30 and operations performed in the same marine field 12 may be dissimilar from one another and overlap with one another in space, time, or sequence.

For instance, as the marine operators 30 move in the marine field 12 to perform their operations, the operations conducted by the multiple operators 30 can influence and affect other operations. Further, outside forces, such as weather conditions, ocean currents, sea state, wave height, wind direction and speed, and other environmental factors can influence the movements of threats, change operations, etc.

To help operators 30 improve safety and operations, the coordination system 10 monitors, forecasts, and proactively coordinates the dissimilar operations between the dissimilar operators 30 in the same marine field 12. To achieve this purpose, the coordination system 10 includes a host service 20 and includes various components installed at the operators 30, support vessels 40, tracking beacons 50, surveillance vehicles 52, etc. The system 10 coordinates the exchange of information with these various entities using communication equipment (not specifically indicated), among other features to be discussed in more detail later.

In the system 10, equipment at the host service 20 acts as a hub for communicating information between the dissimilar operators 30 to coordinate the various operations. The host service 20 can utilize any number of technologies, such as a client-side URL transfer library (e.g., libcurl), an open-source web server (e.g., lighttpd), an open source web application framework (e.g., Catalyst written in Perl), and communications protocol for secure communication over a computer network (e.g., Hypertext Transfer Protocol Secure (HTTPS)).

In turn, the various operators 30, support vessels 40, and other components to be coordinated, positioned, controlled, and tracked by the system 10 can run software features at network devices or computer systems to coordinate plans, tasks, and other details of their operations. Finally, the host service 20, operators 30, and other components communicate information and instructions between one another to proactively coordinate the dissimilar operations in the marine field 12.

Briefly, as operations proceed, the system 10 helps track, manage, and coordinate the operations of the operators 30. As part of this coordination, the system 10 obtains and uses operational information about the tasks, positions, times, and other details of the various operations of the operators 30 in the field 12.

Additionally, the system 10 can obtain and use environmental information about the marine field 12 from various sources, such as observations from operators as well as data from satellites 64 including weather, imaging, and GPS satellites. The system 10 can obtain images and other information using remote vehicles 52, such as unmanned aviation vehicles or the like to take photographs or obtain weather information. Moreover, the system 10 can obtain environmental information from remote base stations 66 on land, such as weather stations and the like.

The monitoring system 10 then uses software, communication systems, satellite and weather imaging, and the like so system users at the operators 30 can visualize and manage the various operations in the marine field 12. Then, over the course of operations, the system 10 tracks the progress, changes, forecasts, etc. of the operations based on stored, planned, and current information. Based on the tracked information, the system 10 can then identify and automatically suggest various scenarios to improve the operations by indicating whether certain operations can be linked with one another, certain operations conflict with one another, etc. and by facilitation changes, resolutions, and modifications to the various operations.

To perform this coordination, the system 10 obtains, combines, and presents a variety of information to the system users at the operators 30. Having access to this information, the system operators 30 can then use the system 10 to coordinate their operations with other operators 30, operations, and conditions in the marine field 12. As discussed in more detail below, system users at the operators 30 use a planning tool of the system 10 to proactively monitor the operations, evaluate risks, and make necessary decisions. These and other details of the system 10 are discussed below.

In addition to monitoring information about the operations of the various operators 30, the disclosed system 10 can monitor environmental conditions (weather, ice, etc.) in the marine field 12 and use those environmental conditions to coordinate the various operations. For example, the marine field 12 can be an icy region having glacial ice, pack ice, ice floes, and other ice obstacles. However, the operators 30 and elements of the disclosed system 10 can be used in any marine field 12 without obstructions or even those with other types of obstructions that can interfere with the operations of the operators 30. Moreover, the disclosed system 10 can be used in marine fields 12 where marine animals, such as schools of fish, whale pods, and the like, may be located.

By operating in the marine field 12, the operators 30 and their operations are subject to threats from moving marine obstacles (e.g., icebergs, ice floes, loose pack ice, and other hazards), marine mammals, weather conditions, etc., that can affect (i.e., cause structural damage) the operators 30 and can affect (i.e., disrupt) the operations. For instance, marine obstacles may be moving freely in the area around the operators 30, and weather conditions, ocean currents, wave height, wind direction and speed, and other environmental factors can influence the movements of these threats. Additionally, icy regions may have pack ice of various thickness and layers. Portions of this pack ice may break loose over time and flow in ocean currents to threaten the operators 30. Therefore, being able to track threats from ice and to monitor pack ice thicknesses and its break up can be beneficial for protecting the operators 30 in such a region.

To help operators improve safety and operations, the coordination system 10 can further monitor, forecast, and proactively guard against these types of various threats. To achieve these purposes, the system 10 has the various support vessels 40, tracking beacons 50, surveillance vehicles 52, and communication equipment (not specifically indicated), among other features to be discussed in more detail later. As part of this management, the system 10 obtains and uses environmental conditions about the marine field 12 from the various satellites 64, remote vehicles 50, base stations 66, and the like.

The coordination system 10 then uses software, communication systems, satellite and weather imaging, and the like so system users at the operators 30 can visualize and manage the various threats and can allocate and direct the various support vessels 40 and other components to track and deal with those threats. To assist in the visualization and management, the system 10 monitors ocean currents, wave height, weather conditions (temperature, wind direction and speed, etc.), debris, and ice in the vicinity of the operators 30 in real time, and the like. This information can then be used to forecast threats, movements of ice, and changes in the environment.

Then, over the course of operations, the system 10 tracks the risks from threats and forecasts how those risks might proceed going forward in time. The forecasting can be based on information such as how local ocean currents usually operate, how such currents are operating now, where icebergs or floes are currently located, what is the confidence in any forecast, etc. Additionally, if the operator 30 is conducting exploration operations, such as a seismic vessel 30b conducting seismic surveys, the seismic vessel 30b has a planned route or track (e.g., $S_1$ and $S_2$) to run. In this instance, the forecasting can be further based on the seismic vessel's current speed, direction, route, planned track, etc.

Based on the tracked risks and forecasts, the system 10 can then identify and automatically suggest various scenarios to improve the protection of the operations and operators 30 by indicating whether threats, obstacles, and the like can be moved or broken up in a suitable time frame, by indicating when to disconnect and move an operator 30 from a forecasted threat, etc.

As discussed in more detail below, system users at the operators 30 use the planning tool of the system 10 to proactively monitor the environment, evaluate risks, and make necessary decisions, such as commanding support vessels 40a-b to intercept marine obstacles that pose a risk and commanding support vessels 40 to perform scouting and icebreaking duties on a predefined track (e.g., "picket fencing," "racetrack," elliptical, orbital, and other patterns). As shown in FIG. 1, for example, the support vessel 40a has been tasked with running a picket fence pattern to thwart off threats from ice by breaking up ice and being prepared to move obstacles when needed.

The operator 30a can also command support vessels 40 to observe and tag identified marine obstacles that pose a risk. For example, the other support vessel 40b in FIG. 1 has been tasked with observing and tagging a particular iceberg. Reconnaissance can also be carried out by remote vehicles 52, such as drones, which can drop beacons 50, take photographs of ice features, make weather measurements, and perform other duties around the operator 30. These and other details of the system 10 are discussed below.

B. Components of Coordination System

With an understanding of the overall coordination system 10, discussion now turns to additional details of the system's components.

Figure 2:
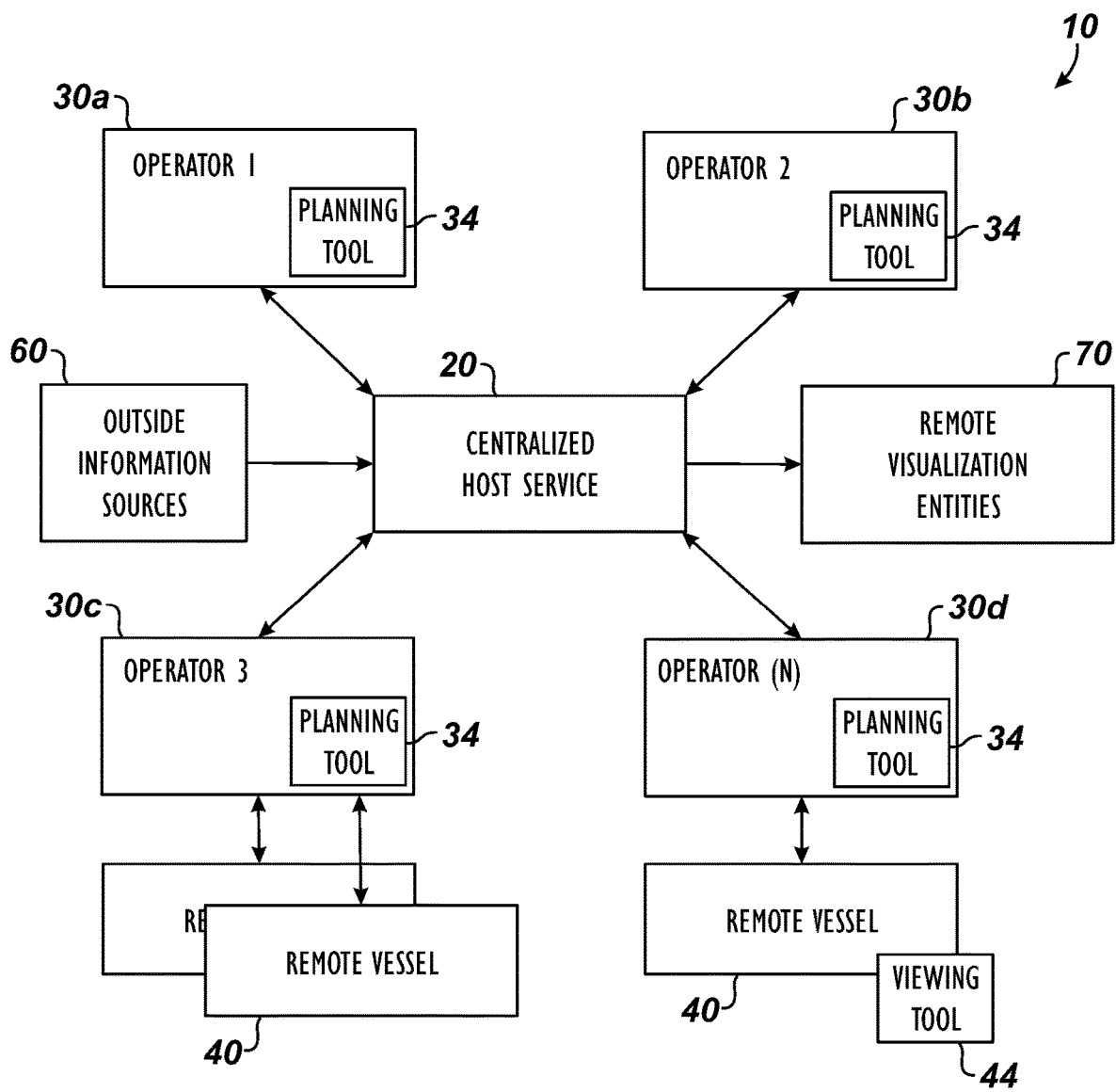
FIG. 2 schematically illustrates an arrangement of operators, remote vessels, host service, and other components of the disclosed coordination system.

FIG. 2 schematically illustrates an arrangement of operators 30a-d, support vessels 40, host service 20, and other components of the disclosed coordination system 10. Any number of operators 30a-d in the system 10 can communicate with the host service 20, which stores and coordinates information for sharing with the operators 30a-d. In general, these operators 30a-d can be entities, installations, vessels, and the like performing operations in the marine field (12). However, an operator 30 can be a remote office having access to information, planning, and coordination of the operations in the marine field.

As noted above, the disclosed system 10 coordinates dissimilar operations conducted by the dissimilar marine operators 30 in the same marine field 12. The disclosed system 10 is a network system having the central server system or host service 20 and having a plurality of nodes with network devices. The network devices can be computer system at each of the various operators 30 in communication with the central host service 20 and with each other as needed. Planning tools 34 at the operators 30 can be capable of publishing data to and receiving data from the host service 20. Operators 30, support vessels 40, etc. without a direct connection to the host service 20 can use a remote vessel subsystem to connect to and share data with connected planning tools 34.

To interface with the host service 20, the various operators 30a-d have planning tools 34 with graphical use interfaces, maps, calendars, charts, and other features for the operators 30a-d to plan their operations in the marine field in conjunction with the other operators 30a-d and operations, as well as any threats, changes, hazards, and the like that may arise. The operators 30a-d may or may not have remote vessels 40 or other operators associated with them that interface with the operator 30a-d and its planning tool 34. The remote vessels 40 and others may have remote visualization tools 44 enabling them to view operational information.

The operators 30a-d use the infield visualization and planning tools 34 to coordinate their operations. The planning tools 34 interface with the host service 20 and provide a common operational picture across all operators 30a-d, oil field activities, installations, vessels, and the like. To achieve this, the planning tools 34 have a graphical user interface that can be used visualize tasks at an operator 30a-d (and at nearby operators 30a-d). Changes made to operations by one operator 30a-d are shared with other operators 30a-d via the host service 20 and are reflected in the interface at the other operators 30a-d, allowing the other operators 30a-d to make their own respective operational changes in response.

In addition to interfacing with the operators 30a-d, the host service 20 can obtain information from outside sources 60, such as satellites (64), base stations (66), weather stations, etc., as noted previously. One way to achieve this is to use web data crawling services, although any number of techniques can be used. The data crawling services monitor and crawl ftp and websites of various data providers or sources 60 to detect new data publications and copy them to storage at the centralized host service 20 for use in the operational planning.

Finally, remote visualization entities 70 outside the marine field (12) can obtain access to operational information and other details related to the marine field (12). These remote entities 70 may not have the ability to coordinate, change, and plan operations of the operators 30a-d in the marine field (12). An example of such a remote visualization entity is a land-based office.

Figure 3A:
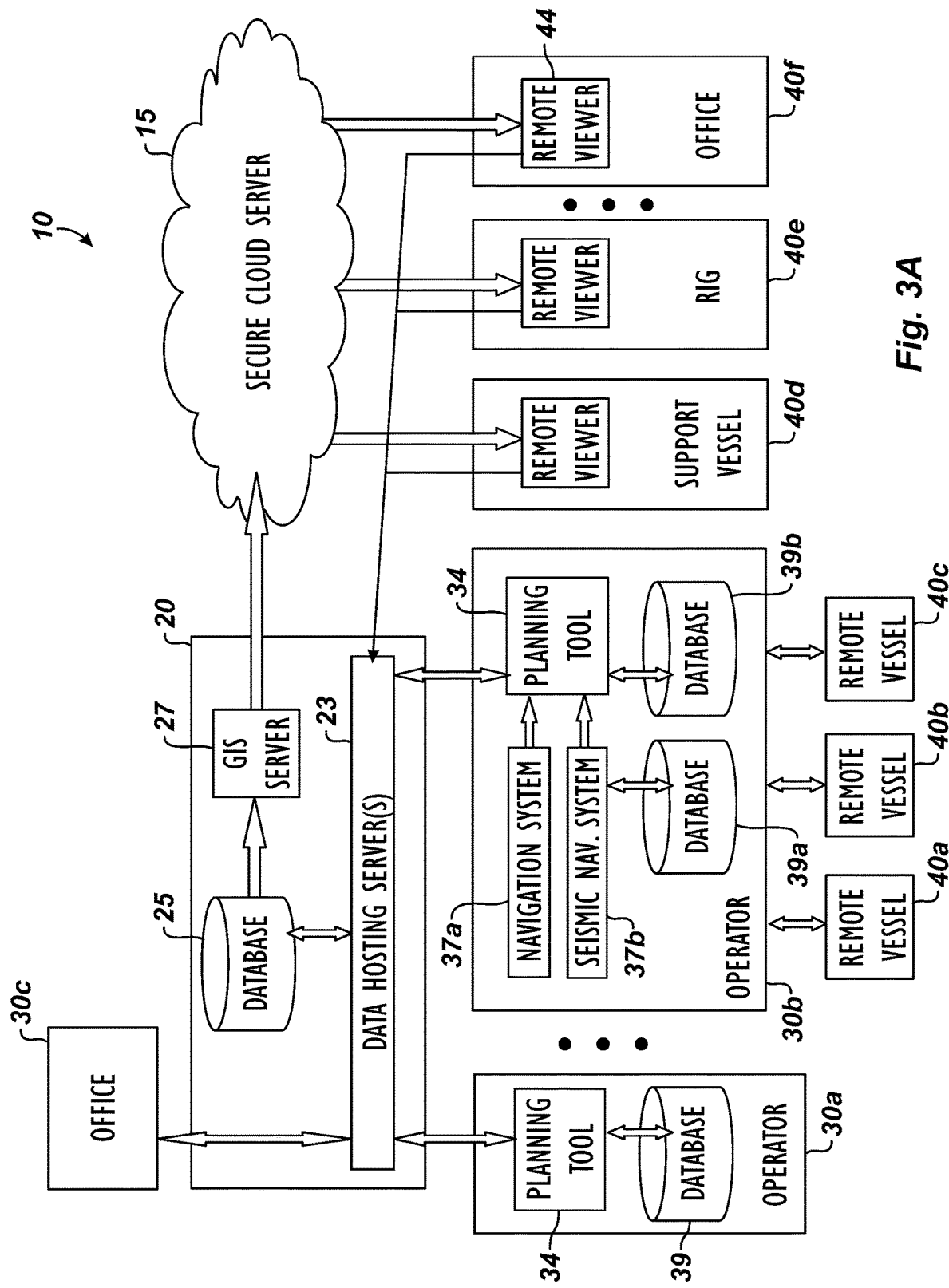
FIG. 3A schematically illustrates the arrangement of components in the disclosed coordination system in more detail.

Turning now to FIG. 3A, a particular arrangement of components in the disclosed coordination system 10 are schematically illustrated in more detail. Again, the host service 20 is shown interfacing with various operators 30, vessels 40, and other installations and entities. In this example, the host service 20 interfaces with a first operator 30a (e.g., FSO), a second operator 30b (e.g., seismic survey vessel), an office operator 30c, and various remote operators, such as remote vessels 40a-c, support vessel 40d, rig 40e, and remote office 40f.

The host service 20 is a network system that uses enterprise data hosting and has one or more dedicated web-based servers 23 with a secure protocol. In this way, the host service 20 can run on dedicated server hardware using various web technologies and protocols. Rather than storing files on a file system, a dedicated relational database system 25 is preferably used for data storage and retrieval.

The host service 20 is designed for multi-user access and includes a permission-based security system. In use, the host service 20 allows infield planning tools 34 and other applications to push data to the service 20 and pull data from the service 20. In this sense, the host service 20 acts as a data hub and data broker between the different operators 30, and hosted data can be downloaded and uploaded by applications onboard the operators 30, vessels 40, and the like. The data stored in the database system 25 can be uploaded and downloaded via multiple connections, while a user permission scheme controls access to the data.

At the host service 20 and database system 25, all operators 30, vessels 40, and the like entering the system 10 may be treated the same and can have data compiled on them, including vessel identifiers, AIS targets, remote vessel, seismic vessels and streamers information, single vessel status message, vessel status logging, etc. In the compiled information, operators 30 can be defined as a "fleet." In general, a fleet can contain operators 30, vessels 40, installations, helicopters, people, etc., which can be added to the "fleet" manually or by clicking on an AIS target of a user interface. Fleet information is stored in the database system 25 and can be useful when creating plans (tasks/routes/positions/time) for operators 30, vessels 40, and the like.

Accessing the compiled and stored information at the host service 20, planning of the operations of the operators 30 can be performed with the planning tools 34, which allow users to create and visualize operational plans (local plans, imported plans from other operators, navigation plans, etc.), calendar events, arrange actions in Gantt charts, etc. In this sense, the planning tools 34 can create, view, and import multiple operational plans that contain temporal events or tasks. The tasks may have spatial elements, such as coordinates, tracks, routes, or locations, in the marine field (12).

The host service 20 stores the various operational plans in the database system 25, along with operational, environmental, and other information, such as live vessel positions, defined exclusion zones, GIS Management data, vessel-based exclusion zones, etc. The host service 20 then distributes these operational plans to the various operators 30 and other entities. To conserve communications and storage needs, only differences or changes in plans may be communicated.

The host service 20 aggregates, stores, visualizes, and distributes positional data for the operators 30, the support vessels 40, etc. Plans for operations can be created, visualized, stored, and distributed for user-defined fleets of operators 30, support vessels 40, etc. Movements of rogue vessels (e.g., rogue fishing vessels, tourist diving, pirates, etc.) can be logged. The host service 20 can also automatically monitor operator and vessel positions in relation to defined operational exclusion zones.

At the operators 30, the planning tool 34 has a collection of processes, user interfaces, and applications. The planning tool 34 interfaces with on-board, real-time sensing devices (e.g., GPS, Gyro, AIS, Radar, etc.), downloads data from the host service 20, and combines operational observation data (e.g., ice berg, marine mammal, Metocean observations, etc.) to the mix of information. All of the data associated with the planning tool 34 is geo-referenced and time-stamped when it is logged and stored so it can be coordinated with other data.

The planning tools 34 in conjunction with the host service 20 allow system users at the operators 30 to view and monitor simultaneous operations within the busy oil field (12). The planning tools 34 imports localized GIS data assets (raster/vector) to be viewed in the applications of the tools 34. For example, an AIS interface of the host service 20 can provide a feed of AIS transmitting vessels in the vicinity. Other vessel information such as real-time seismic spread information and unauthorized or rogue vessels can be merged with the AIS information to form a more complete picture of the operators 30 in the field (12). These operators 30 are displayed in the planning tools 34 and are logged to the database system 25.

When a remote vessel 40 sails within radio range of the planning tool 34 of an operator 30, a connection can be established and operational information can be shared. Multiple remote vessels 40 may connect to any one of the planning tools 34.

In the end, all known positions of operators 30, vessels 40, etc. are monitored in relation to other operators 30, vessels 40, exclusion or safety zones, etc. The planning tools 34 monitor information continually and make the results visible to the operators 30 through the graphical representations and maps of the planning tools 34.

In addition to real-time positions and movements, the planning tools 34 allow the operators 30 to define operational plans for the particular operators 30 or for any vessel 40 in the operator's fleet. Plans can be created manually in the planning tool 34, loaded from a file, or received from other planning tools 34 via the host service 20. Needless to say, operational plans can be published to the host service 20 so they may be shared with others.

The planning tools 34 at the various operators 30 can also interface with other local systems to relay, display, and coordinate information. For the seismic vessel 30b, for example, the planning tool 34 can interface with a navigation system 37a, a seismic navigation system 37b, and databases 39a-b of the vessel 30b. Using this local interfacing with the seismic navigation system 37b, for example, the planning tool 34 can access real-time spread positions, preplots, and active seismic plans to be used, logged, displayed and shared with others. This information can be published to the host service 20 so it can be shared with other planning tools 34 of other operators 30 as needed.

In addition to the infield visualization at the planning tools 34, the system 10 can provide remote visualization. For example, data can be made available to third parties via standard GIS Web-based/cloud technologies, such as a secure cloud server 15. The latest data from the host service 20 is used to update a cloud GIS server 27. Remote users can then access a common operational picture through remote viewers 44, web browsers, and the like. As shown in FIG. 3A, the remote viewers 44 can communicate information, inputs, data, and the like to the host services 20.

Figure 3B:
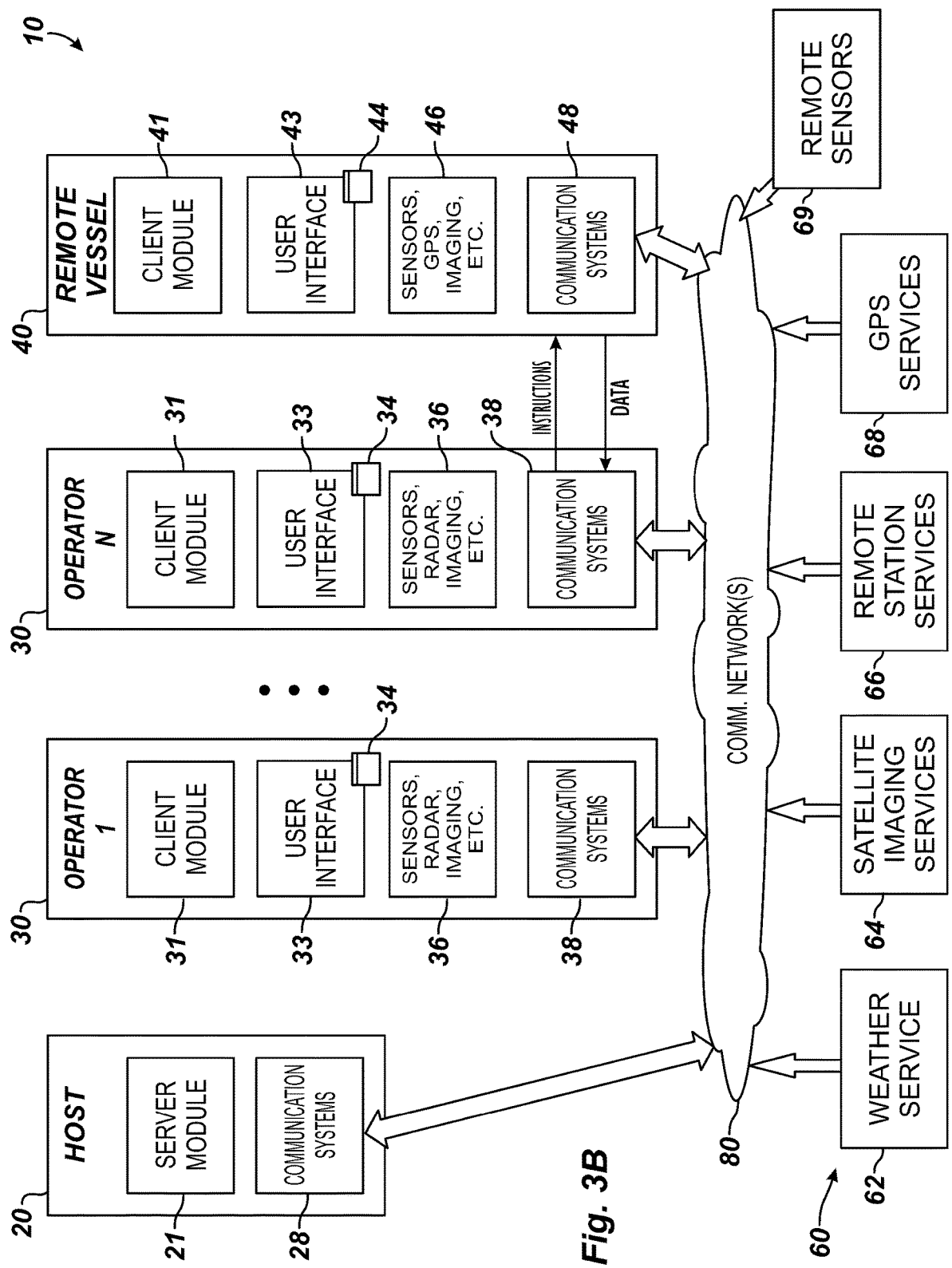
FIG. 3B schematically illustrates some of the components of the disclosed coordination system, including host, operators, remote vessels, and various services used by the system in more detail.

FIG. 3B schematically shows some of the components of the coordination system 10, including the host service 20, operators 30, and support vessel(s) 40 in additional detail. Also depicted are various services 60 used by the system 10. As will be appreciated, other related components can also be used and may be based on some of the same concepts detailed below. Moreover, a given implementation may have more or less of these components.

Looking first at the host service 20, it has a server module 21 and communication systems 28. The server module 21 includes the requisite server hardware, memory, interfaces, and the like. During operations, the communication systems 28 obtain data from various remote services 60, including weather 62, satellite imaging 64, remote base station 66, GPS services 68, remote sensors 69 (e.g., buoys, beacons, etc.), and other such services using satellite, cellular, or other communication networks 80. Satellite imaging 64 can use Synthetic Aperture Radar (SAR) to map and monitor flotsam, jetsam, debris, icebergs, ice floes, and other sea ice and can provide images in real-time (or at least near real-time) via the Internet or other communication networks 80. In addition to these remote services 60, the host service 20 may have its own sensors (not shown), such as radar, imaging, weather, and other such systems, that can also collect local data in the marine field (12).

Furthermore, system users may be able to access a user interface (not shown) of the host service 20 and the various monitoring and control features of the server module 21 to analyze and organize the collected data. The server module 21 runs on servers, workstations, or the like of the system's client-server architecture, which is described later. Although one host service 20 is depicted, more than one host service 20 can be used in the system 10 to share or divide information and data handling.

For their part, the operators 30 include client modules 31, user interfaces 33, sensors 36, and communication systems 38. The user interfaces 33 include the planning tools 34 as discussed herein. Rather than having server modules, the operator 30 have these client modules 31, which can include the requisite computer hardware, memory, interfaces, and the like. During operations, the operator 30 can exchange information with the host service 20 using the available communications networks 80. At least some of the operational information can be obtained using automatic communications between the hub (host service 20) and the nodes (networked devices of the operators 30). At the same time, the operator's communication systems 38 can also obtain data directly from the various remote services 60.

If desired, operators 30 may be able to communicate directly with one another through the available communications networks 80. However, communications for the operators 30 are primarily handled through the available communications networks 80 and the host service 20, as discussed herein. Further, communications of information between the operators 30 and host service 20 can be controlled by groupings of certain operators 30 (e.g., those of the same company), permissions, data privileges, etc. In the end, the host surface 20 can determine and handle associations or groupings between operators 30 for exchanging information so that certain subsets of data are shared only with some operators and not others as defined by rules, permissions, etc.

The operators 30 also have various local sensors 36 for collecting local data for use in monitoring and analysis. Some local systems 36 include weather devices, Differential Global Positioning System (DGPS), echosounder, Acoustic Doppler Current Profiler (ADCP), Automatic Identification System (AIS), radar (normal & ice), SONAR, and other systems.

Users at the operators 30 use the user interfaces 33 and the various monitoring and control features of the client modules 31 to prepare plans for operations. Likewise, the users can use the user interfaces 33 to analyze and organize collected data and relay that data and other information to the host service 20, other operators 30, and remote vessels 40.

The remote vessels 40 can include client modules 41, user interfaces 43, sensors 46, and communication systems 48. The client module 41 includes the requisite computer hardware, memory, interfaces, and the like. The user interfaces 43 include the remote viewers 44 as discussed herein. Overall, the client modules 41 and user interfaces 43 at the remote vessels 40 may not allow users at the vessels 40 to plan or coordinate operations although data and instructions can be exchanged with associated operators 30, the host service 20, or others, as the case may be.

C. Client-Server Architecture

Discussion now turns to additional details of the system's architecture. As mentioned previously, the system 10 can use a client-server based architecture reflected in FIGS. 3A-3B. Server modules 21 can be used at the host service 20, and client modules 31/41 can be used at the operators 30, remote vessels 40, and other components. Alternatively, one or more server modules 21 can be used at one or more of the operators 30 in a distributed architecture.

As will be appreciated, the system 10 may involve more host services 20 and/or more or less operators 30. Additionally, client modules 31 can be used on a number of other components, such as remote vessels, as noted previously. The various client modules 31 communicate with the sever module 21, which operates as the central control of the system 10. In some situations, however, the client modules 31 can also communicate with one another to pass information and instructions.

Being client-server based, the architecture can have various processes distributed throughout these modules 21, 31, and 41. In this way, a client module 31 at an operator 30 can be its own operational system that can operate independently of the server module 21. Yet, the server module 21 can control the overall operation and can add and remove client modules 31 from the architecture's configuration.

Figure 4A:
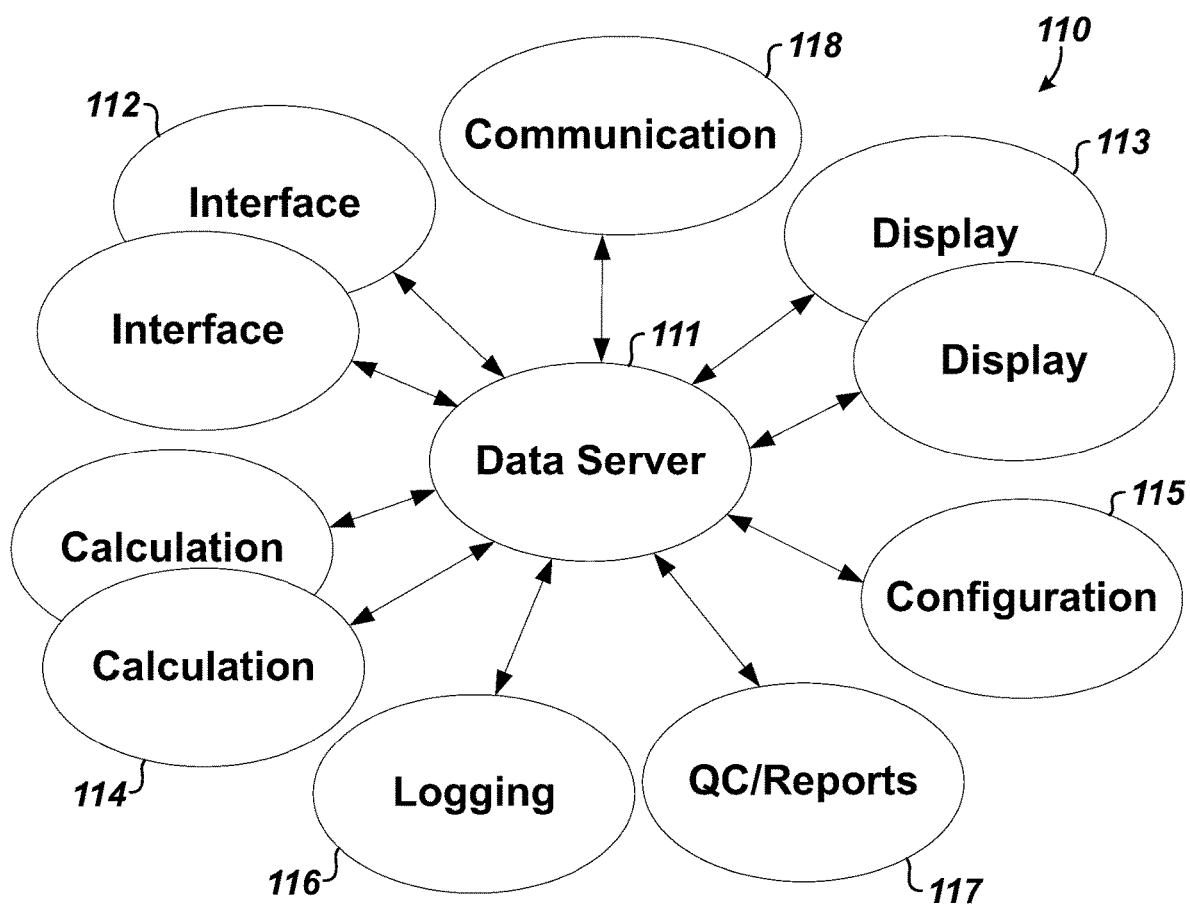
FIGS. 4A-4B schematically illustrates features of a client-server based architecture for the disclosed coordination system.

To that end, as shown in FIG. 4A, various processes of the system's client-server architecture 110 can be distributed and shared across the coordination system (10) and its modules (21, 31, and 41). A data server process 111 can operate as a central process and a communication hub between all the various processes and can operate independent of any client processes. Various interface processes 112 can communicate with onboard equipment of the operators (30), vessels (40), installations, etc. and can communicate with external sources to obtain information. For example, the interface processes 112 can receive information from navigation systems (e.g., GPS, Echosounder, PRH, Gyro, radar, etc.), satellite imaging, weather forecast data, etc. The interface processes 112 can also output information to other systems, such as steering control systems, navigation systems, alarm systems, etc.

Display processes 113 can be configured for use on various displays distributed throughout the system's architecture 110. Each display can be configured as required by the user, and various satellite and other images of the environment showing ice formations, weather, and other details can be displayed in user interfaces of the display processes as described below. Additionally, vessel and obstacle positions can be overlaid on the images in the system's user interfaces, and obstacles can be assigned attributes to describe their past and predicted tracks, sizes, levels of threat, and other details.

Calculation processes 114 can compute vessel positions, carry out collision detection, predict paths of vessels and obstacles, and perform other calculations. Predicting paths of obstacles can help operators and the system (10) to assess threats and risks and to implement tasks to deal with them. For example, by performing collision detection between operators (30), ice obstacles, etc., the calculation processes can generate alarms if potential collisions are predicted.

Configuration processes 115 can allow operators to configure the system's operations, such as define the data interfaces, displays, workstations, support vessels, logging locations, communication parameters, and any exception criteria for alarms. In addition to operating in conjunction with the operators 30, support vessels 40 can be set up with system components that can operate independently from the operators 30. Notably, the configuration processes have planning tools 34. As discussed herein, the planning tools 34 are a user interface application that allows system operators to view operations and define and coordinate plans for the operators (30).

Logging processes 116 can log data for monitoring purposes. For example, the architecture 110 logs the various operator 30, vessel 40, and obstacle positions with their corresponding attributes at suitable intervals to create a history of activities. This information can be used for replay analysis or auditing purposes and may be stored in an audit database. Such logged information in an audit database can track all the data acquired and the various operational decisions made, which can be especially useful for reconstructing events should something go wrong during operations. The architecture 110 also tags and logs the data files for later reference. Using all of the logged and tagged information, system users can create reports for operators 30, vessels 40, operations, obstacles, etc.

Finally, the communication processes 118 can pass data between the host service (20), operators (30), support vessels (40), and other components. Using the various forms of communication, the architecture 110 automatically updates operators (30), vessels (40), and other entities with information. The communications can be sent over maritime Very Small Aperture Terminal (VSAT) satellite links, multi-bandwidth radio links, or other communication links.

Inclement weather often interferes with satellite communications, and wireless communications in the Arctic or other regions may not always be possible depending on the weather. For this reason, any of the operators (30), vessels (40), and the like can store data until it can be reported once conditions allow. Additionally, these components can have alternate communication abilities, such as point-to-point radio, so a drone or vessel can be directed near any key sensor or component to retrieve data and report it back during satellite or wireless outages.

Figure 4B:
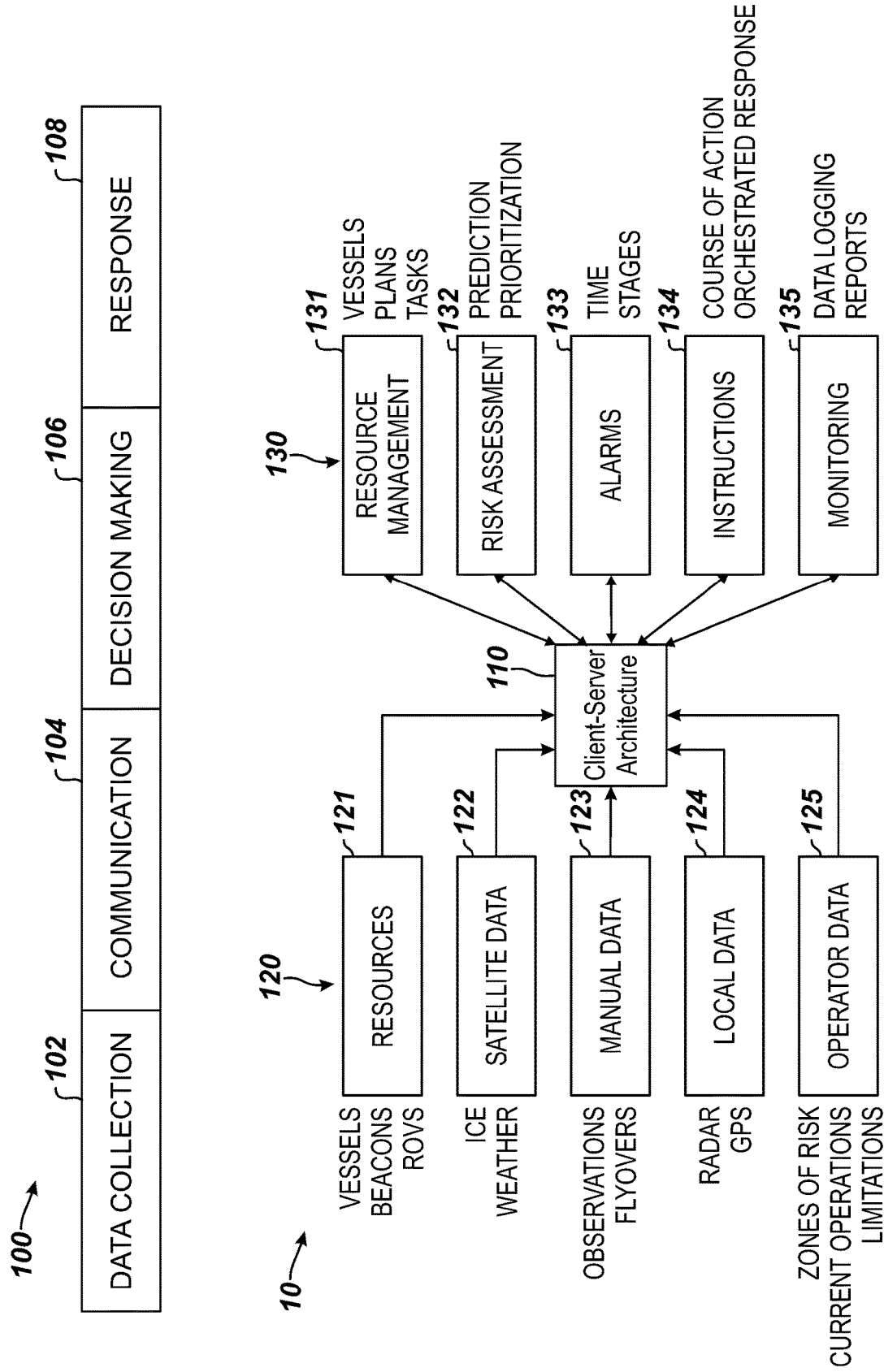

Having an understanding of the components of the system 10 and its architecture, discussion now turns to processing methodology and data handling performed by the system 10. As shown in FIG. 4B, the system's processing methodology 100 involves data collection (Block 102), communication (Block 104), decision-making (Block 106), and response (Block 108).

As an initial matter and as shown in FIG. 4B, the client-server architecture 110 has various resources and data sources 120, which are involved in the data collection (Block 102) of the system's processing methodology 100. As noted previously, some of the resources 121 include the vessels, beacons, remote vehicles, and other components for collecting data for the client-server architecture 110. Satellite data 122 can come from weather, ice imaging, and GPS satellites, and manual data 123 can come from visual observations, flyovers, and the like. The client-server architecture 110 can also obtain local data 124 at the operators 30 from radar, GPS, and the like.

Finally, the entities (operators 30, support vessels 40, installations, etc.) have their own electrical, alarm, and operational systems, and this operator data 125 can be used by the client-server architecture 110. Furthermore, any current operations performed on the operators 30 and the operator's limitations, characteristics, etc. can be part of the vessel data 125 available to the client-server architecture 110. For example, the operator 30 may be able to handle various levels of wind, current, and ice over a certain period of time, but may have structural limits that need to be accounted for.

In addition, the operations of the operator 30 may be able to handle some amount of disruption, threat, conflict, etc., and the operator data 125 can account for such operational limits. For example, current operations (drilling, production, or exploration) being performed with the operator 30 may dictate how much time is needed to shut down the operator 30 and/or operations (and move it to another location if needed). In other words, the operator 30 may need to halt drilling, to pull a riser, or to pull in seismic streamers before the operator 30 can be moved or redirected, and these operations can take a particular amount of time to complete. If these operations are occurring on the operator 30, any time frame for risk assessment can account for the length of time to complete the "set" (i.e., stationed or planned) operations, to shut down the operations (e.g., stop drilling, remove a riser, reel in seismic streamers, etc.), to move the operator 30, to evacuate the personnel, and the like. Any time intervals involved will depend on the type of structure (i.e., operator 30, vessel 40, etc.) involved, the type of "set" (i.e., stationed or planned) operations being performed (e.g., drilling, production, exploration, etc.), and other factors.

To obtain and transfer all of this collected data (Block 102) as shown in FIG. 4B, the client-server architecture 110 uses various forms of communication (Block 104). As noted throughout, the various components of the system 10 can use any of a number of available forms of communication (Block 104) for the environment of interest. In general, satellite or radio communications can be used depending on weather conditions, and other forms of wireless communication using relay stations and the like can be used. As will be appreciated, many types of communication systems can be used.

Having the collected data (Block 102) communicated to it, the client-server architecture 110 goes through various decision-making processes (Block 106) to determine an operational picture, determine associations between operations, and develop a managed response (Block 108). The decision-making process (Block 106) can use predictive algorithms, decision trees, risk weighting, and other techniques and can be handled by automatic computer processing and human intervention to manage operations, threats, and other conditions.

In particular, the architecture 110 in the decision-making and response processes (Blocks 106, 108) manages the resources and data sources 120 and their data collection (Block 102) by tracking, directing, and configuring the operators 30, vessels 40, beacons, and the like to coordinate operations, collect data, address threats, etc. Then, the client-server architecture 110 can provide, share, exchange, etc. the operators (30), vessels (40), etc. with results 130, such as resource management 131, risk assessment 132, alarms 133, instructions 134, and monitoring 135.

In the resource management 131, for example, system users can manage various plans, tasks, and the like for the operations of the operators (30), vessels (40), beacons (50), vehicles, and other resources in the marine field (12). As operations continue, results for risk assessment 132 can predict associations, linkages, conflicts, threats, etc., can prioritize tasks, and can perform other assessments. Then, depending on the associations, threats, etc. and their severities, alarms 133 can be triggered based on various time intervals or stages to warn operators 30 of associations, threats, etc. to the operators 30, vessels 40, and the like.

Finally, operators 30 can relay instructions 134 to other components of the system 10, such as support vessels 40 and the like, and can direct a course of action and orchestrate a response. In the monitoring 135, the client-server architecture 110 monitors the entire operation by logging the data collected and producing reports and the like for further analysis.

D. Simultaneous Operations Planning Process

Figure 5A:
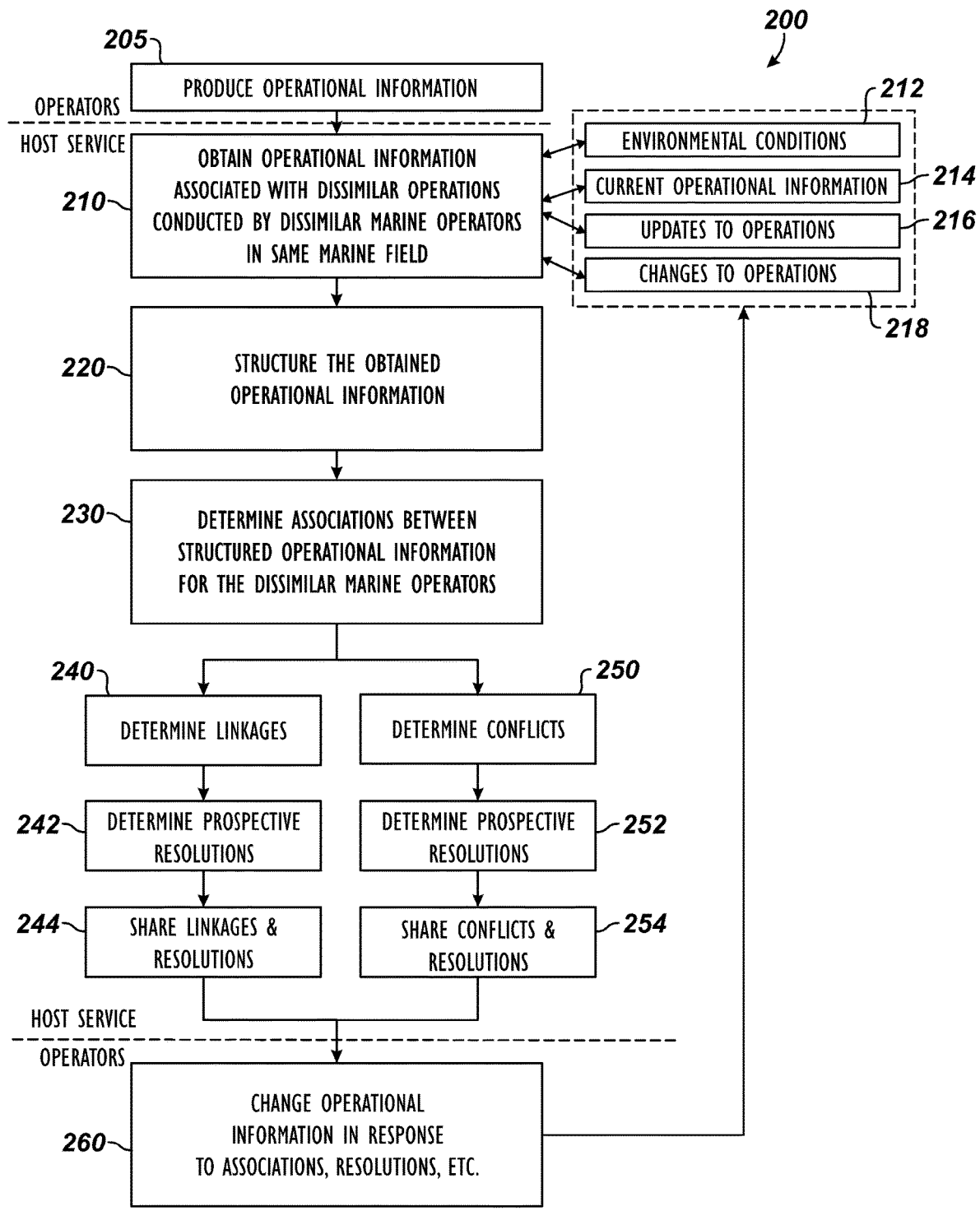
FIGS. 5A-5C illustrate simultaneous planning and coordinating of the disclosed system in flow chart form.
Figure 5B:
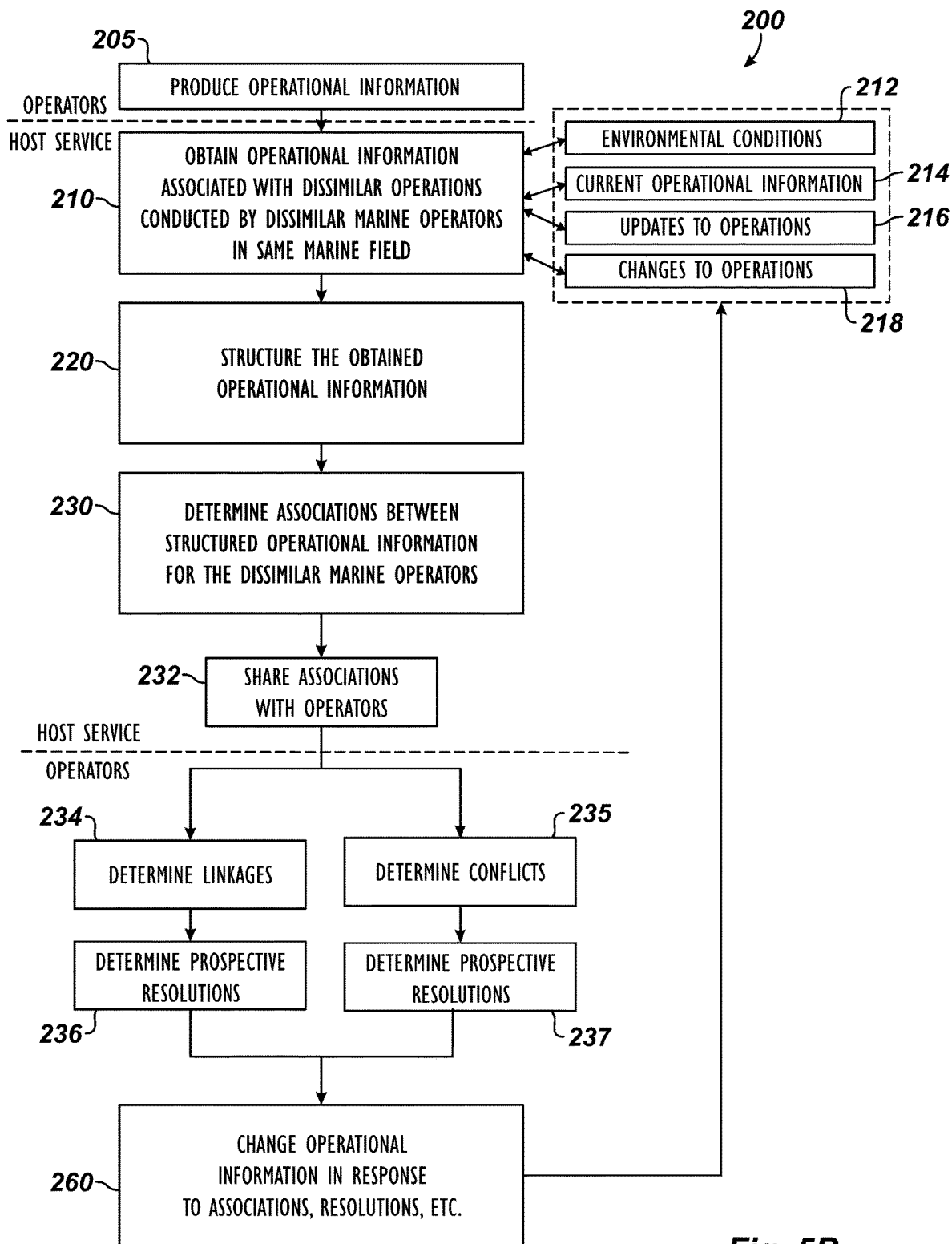
Figure 5C:
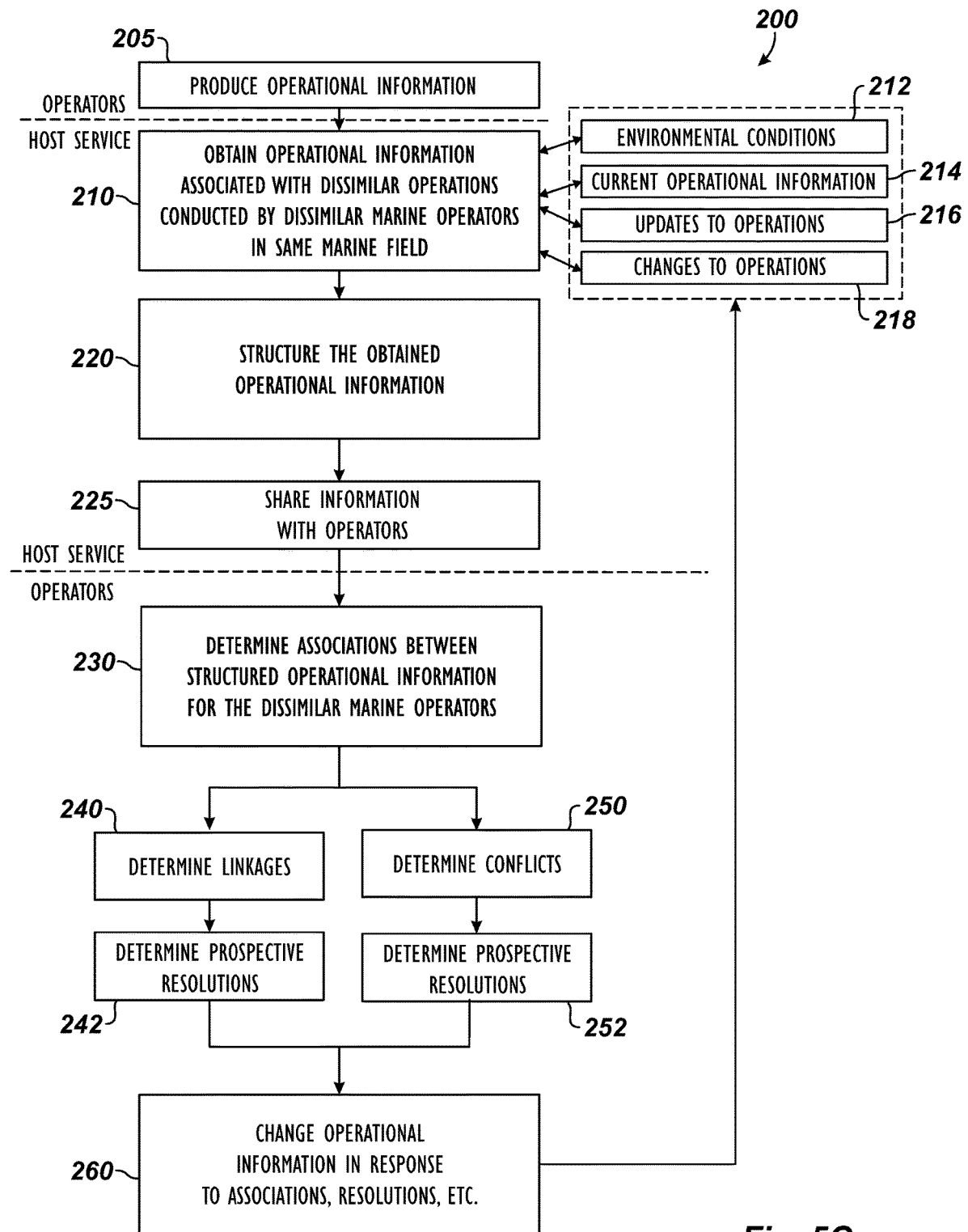

To perform the simultaneous operations planning, the disclosed system uses a coordination process 200 as shown in FIGS. 5A-5C in flow chart form. In each of these processes 200 of FIGS. 5A-5C, some steps are performed at and by the operators' systems, while other steps are performed at and by the host service 20. Some steps may actually be shared between both the operators' systems and the host service 20.

In general, each process 200 of FIGS. 5A-5C starts with one or more operators 30 producing operations information (i.e., plans, tasks, etc.) (Block 205). This operational information is communicated to the host service 20 from the operators 30, as disclosed herein, so the host service 20 can then handling the operational information and ultimately share it among the various operators 30. Overall, the host service 20 can have an active role, a passive role, or some intermediate role in handling the operations information. As a corollary, the planning tools 34 and systems at the operators 30 can have a more passive or active role, as the case may be. With that understanding, the process 200 in FIG. 5A shows the embodiment in which the host service 20 has an active role in handling the operational information, while the process 200 in FIG. 5C shows the other embodiment in which the host service 20 has a more passive role in handling the operational information. For its part, FIG. 5B shows the embodiment of the process 200 in which a more intermediate role is shared between the operators 30 and the host service.

Looking first at FIG. 5A, the process 200 begins with the one or more operators 30 producing operational information (Block 205). For example, an operator 30 may generate or start to generate various plans, tasks, and the like for its operations over time in the subject area. Other operational information may be produced at the same time by other operators 30, and the host service 20 may already have some operational information stored from other operators 30.

At this point, the host service 20 of the system 10 obtains operational information associated with the dissimilar operations conducted by the dissimilar marine operators 30 in the same marine field 12 (Block 210). As noted herein, the host service 20 can obtain the operations information communicated to it from the various operators 30. In general as will be described below, the operational information can include several forms of information including one or more task, plan, event, activity, location, position, condition, notification, alert, update, execution, performance information, time, rule, observation, real-time data, etc. Because the marine field 12 has several dissimilar operators 30 performing dissimilar operations, the operational information can be quite dissimilar and disparate given the implementation.

In obtaining the operational information, the host service 20 can obtain plans having one or more of task information, position information, and time information of the dissimilar operations for the dissimilar marine operators 30 in the same marine field 12. The task information can include one or more of: task, event, activity, step, sequence, task description, hierarchical task execution, conducted operation, approval requirement, responsible party, dissimilar marine operator identifier, exclusion zone, resource requirement, Automatic Identification System (AIS) data, fleet definition, etc. The position information can include one or more of: vessel position, Geographic Information System data, exclusion zone definition, vessel Global Positioning System data, satellite imagery, RADAR data, navigation data, unauthorized vessel observation, dissimilar marine mammal observation, weather observation, streamer position, seismic shooting plan, vessel traffic data, weather data, route, depth, position, location, planned path of survey vessel, exclusion zone, etc. The time information can include one or more of: start, end, duration, schedule, frequency, exclusion period, etc.

The host service 20 then structures the obtained operational information (Block 220). Structuring the obtained operational information (Block 220) can involve relationally aggregating together the operational plans (e.g., tasks, positions, times, etc.) for the dissimilar operators 30. The operational plans can be arranged in one or more spatial representations of the marine field 12 and in one or more temporal representations for sharing with the dissimilar operators 30. The operational plans can also be arranged in one or more relationships between the dissimilar operations and/or the dissimilar operators 30 for sharing among them.

With the information structured, the host service 20 determines associations between the structured operational information for the dissimilar operators 30 (Blocks 230). As discussed below, the host service 20 can determine at least two types of associations, including linkages (Block 240) and conflicts (Block 250) between the operational plans for the operators 30. The host service 20 then shares the determined associations with the dissimilar operators 30 (Block 244, 254).

In determining the associations as noted above, the host service 20 can determine various linkages between the operational information (Block 240). For example, one or more of the task, position, and time details involved in one operator's operational plan for a marine operation may occur in a compatible fashion with the operational plan(s) of one or more other operators 30. To determine such a compatible linkage, the host service 20 can determine from the structural information that the respective operational plans coincide in one or more of space, time, and sequence without violating an exclusionary rule.

In determining the associations as noted above, the host service 20 can also determine various conflicts between the operational information (Block 250). For example, one or more of the task, position, and time details involved in one operator's operational plan for a marine operation may occur in an incompatible fashion with the operational plan(s) of one or more other operators 30. To determine such an incompatible conflict, the network system can determine from the structured information that the respective operational plans violates at least one rule.

The rules can be defined by the marine operators 30, can be predefined based on the type of operation involved, may be imposed by an outside party or reason, etc. For example, one type of rule can be user-configurable, and the marine operators 30 can establish the particular rule as part of the operational plan obtained by the system 10. An example of such a rule can include a minimum distance that should be maintained by other vessels when an operator is conducting a diving operation.

Another type of rule may be dictated by the particular operation of the operator's operational plan. For example, the marine operation can be seismic survey and may require an "infill" pass (or repeat pass) over an acquisition line if there was significant feathering of the streamer array during the first pass, which is naturally established as a rule for such an operation. The requirement for an infill pass typically happens if there are strong cross currents across the acquisition line Such an established rule can then exclude other operational plans (tasks, positions, timing, etc.) that conflict in space, time, or sequence with the rule.

In one implementation, the host service 20 can determine the associations (e.g., linkages and conflicts) and can share them with the operators 30 of the particular plans involved (Block 244, 254). In other circumstances, the associations (e.g., linkages and conflicts) may be shared with more than just the operators 30 of the operational plans involved in the conflict. This can depend on the relationship of the operators 30 and plans involved or in the type of operations involved in the conflict. In another implementation, the planning tools 34 at the operators 30 may determine the associations (e.g., linkages and conflicts) with other operational plans and may share those with the other operators 30 via the host service 20.

In any event, once the linkages and conflicts and/or resolutions are shared from the host service 20 with the operators 30, system users at the planning tools 34 at the operators 30 can assess the associations (linkages and conflicts) of the task, positions, timing and other operational details of their plans to achieve operation(s) and can change the details in response to the association (Block 260). For example, the user may change the route, timing, or extent of an operation in light of other operations being performed in the same marine field 12 by other operators 30. Such changes to operations (Block 218) are then fed back to the host service 20 as part of its process to obtain operational information so the changes can be structured, processed, and again shared amongst the operators 30.

In a further implementation, the host service 20 can determine or configure prospective resolutions to the associations (linkages and conflicts) (Blocks 242, 252), and the resolutions can be shared along with the associations for the dissimilar marine operators 30 (Blocks 244, 254). The resolutions can be prioritized based on rules since some types of operations may have more importance than other operations. Overall, such rules can seek to minimize further conflicts with other operational plans, minimize operational costs, minimize operational impacts, etc.

In determining the resolutions (Blocks 244, 254), consideration by the system 10 can be made to downstream consequences for each of the resolutions to the operational plans of the respective operators 30 as well as other operators 30 in the marine field 12. As expected, offering one resolution to a conflict between the operational plans between two operators 30 can have downstream consequences to the additional tasks, positions, timing for those same operators 30 as well as other operators 30 and their plans in the same field 12.

With the resolutions to the associations (linkages and conflicts) proposed, the host service 20 can obtain selections to the resolutions as the changes to operations (Block 260). In turn, the host service 20 can restructure, re-determine, and re-share determined associations (linkages, conflicts, etc.) between the operational plans of the operators 30 in light of the selected resolutions (Block 218).

Rather than having the centralized host service 20 determine the associations (Blocks 230, 240, 250) and share those with the operators 30 (Blocks 244, 254), the host service 20 can instead rely on the planning tools 34 at the operators 30 to determine these associations (linkages, conflicts, etc.). Moreover, rather than having the centralized host service 20 determine the resolutions (Blocks 242, 252) and share those with the operators 30 (Blocks 244, 254), the host service 20 can instead rely on the planning tools 34 at the operators 30 to perform that, even when the host service 20 communicates the associations (linkages or conflicts) to the operators 30 (Blocks 244, 254).

For instance, FIG. 5B shows the coordination process 200 where the host service 20 determines the associations (Block 230) and shares them with the operators 30 (Block 232). However, the process 200 allows the planning tools 34 at the operators 30 to determine particulars about associations (linkages and conflicts) (Blocks 234, 235) and to determine resolutions of the particular associations involved (Blocks 236, 237) so that operational changes can be accepted (Block 260) and sent back to the host service 20 (Block 210).

Even further, FIG. 5C shows the coordination process 200 where the host service 20 is even more passive. In this instance, the host service 20 obtains operation information (Block 210), structures the information (Block 220), and then shares that information (Block 225). At this point in the process 200, the planning tools 34 at the operators determine the associations (Block 230), including particulars about associations (linkages and conflicts) (Blocks 240, 250) and resolutions of the particular associations involved (Blocks 242, 252) so that operational changes can be accepted (Block 260) and sent back to the host service 20 (Block 210).

There can be a number of advantages between more active and passing handling of operational information between the host service 20 and operators 30. As one example, the process 200 in FIG. 5C can be beneficial when communications are lost for whatever reason between the host 20 and operators 30. Even when this occurs, the planning tools 34 at the operators 30 can determine the requisite associations so that resolutions and changes can be made. In this, local solutions can still be found to the operational issues as long as specific communicated rules and guidelines are followed.

E. Monitoring Current Operational Conditions

In obtaining the operational information (Block 210), the host service 20 can further monitor current operational conditions of the dissimilar operations conducted by the dissimilar operators 30 in the same marine field 12. In general, the current operational conditions can include an observation, a threat, a hazard, a notification, an alert, a performance, an update, a change, an execution, a completion, a start, an end, etc. When handling these current operational conditions, the host service 20 can continually or periodically update the structure, the determinations, and the sharing of the information with the dissimilar operators 30 in light of the current operational conditions.

For example, current operations conditions may indicate that a planned task by an operator 30 is not being (or will not be) performed as planned, either because a required operator 30 is not available or is delayed. For instance, a tanker filing operation scheduled for a particular date and time at a set location in the field 12 may not be performed as planned in the operational information because current operational conditions indicate the tanker is delayed at arriving. Thus, this current operational condition may affect other tasks, plans, etc. for other operators 30 associated with that same operation, the same location, the same time, etc. The host service 20 monitors such details from the current conditions and can then update the structure, the determinations, and the sharing of the requisite information.

As another example of how current operational conditions can be monitored to then adjust the operational plans of the operators, some operational plans may be dynamic (not static) so that current operational conditions can (and likely will) adjust the plans. For instance, an operator in a seismic survey may not know if a survey line needs to be re-shot until the operator has first made an initial pass of the line and has then determined whether that initial pass was good enough. Therefore, the acquisition plan/survey path may need to be dynamically updated several times during the course of the survey, and the current conditions for such circumstances can be monitored to adjust the plan.

F. Monitoring Current Environmental Conditions and Threats

To deal with marine obstacles and other threats in the marine field 12, the coordination system 10 can use marine threat monitoring and defense as disclosed in co-pending U.S. application Ser. No. 14/077,467, filed 12 Nov. 2013 and U.S. Provisional Appl. 62/013,380, filed 17 Jun. 2014, which are incorporated herein by reference in its entirety. These features of the marine threat monitoring and defense can protect entities in the marine field 12, such as areas in the Arctic, having floating and/or submerged objects that move in the ocean and threaten the entities.

In obtaining the operational information (Block 210), for example, the host service 20 can further monitor current environmental conditions (Block 212) in the same marine field 12. In general, the current environmental conditions 212 can include an observation, a threat, a hazard, an ice condition, an oil spill, a weather condition, a sea mammal observation, a sea level, a temperature, an unauthorized vessel, etc. These conditions 212 can come periodically or continually from a number of network sources 60, such as described previously, and even from observations from other operators 30, support vessels 40, and the like. Given the current environmental conditions 212, the host service 20 can update the structure, the determination, and the sharing of the operational information with the operators 30 in light of the current environmental conditions 212.

Using predictive analysis and algorithms, the host service 20 can further predict a threat by the current environmental conditions 212 to the operational plans of the operators 30. The predicted threats can then be associated with the structured operational information being considered for linkages and conflicts and for sharing with the operators 30.

For example, a particular environmental threat from an ice berg, ice floe, weather system, etc. can be predicted in forecasts of the marine field 12. Users at the operators 30 and vessels 40 can obtain the operational information updated in response to the determined associations and the predicted threats. This, in turn, can allow operators 30 to respond to the threat, changing operational plans.

In sharing the determined associations (Blocks 232, 244, 254), the host service 20 can share the determined associations with entities outside the same marine field (12), such as remote offices or viewers. To share information, the host service 20 can push the determined associations from the host service 20 to a cloud-based server system having Geographic Information System data and can make the determined associations available via one or more networks.

More interestingly, the determined associations and other operational information can be published for comparative display in the planning tools 34 at networked devices of the respective operators 30. The host service 20 can obtain updates 216, changes 218, etc. from the planning tools 34 at the networked devices of the respective operators 30 and can share those updates 216, changes 218, etc. for comparative display in the planning tools 34 at the respective operators 30.

The information can be shared in a number of ways. For example, the operational information, plans, linkages, conflicts, etc. can be shared in a spatial map of the marine field 12, which can be viewed in the planning tools 34 at the operators 30. The spatial display can be selectively configurable over a time span so operators 30 can view the various plans and their interactions over time (in the past or future).

G. Example Operator Interaction

Figure 6:
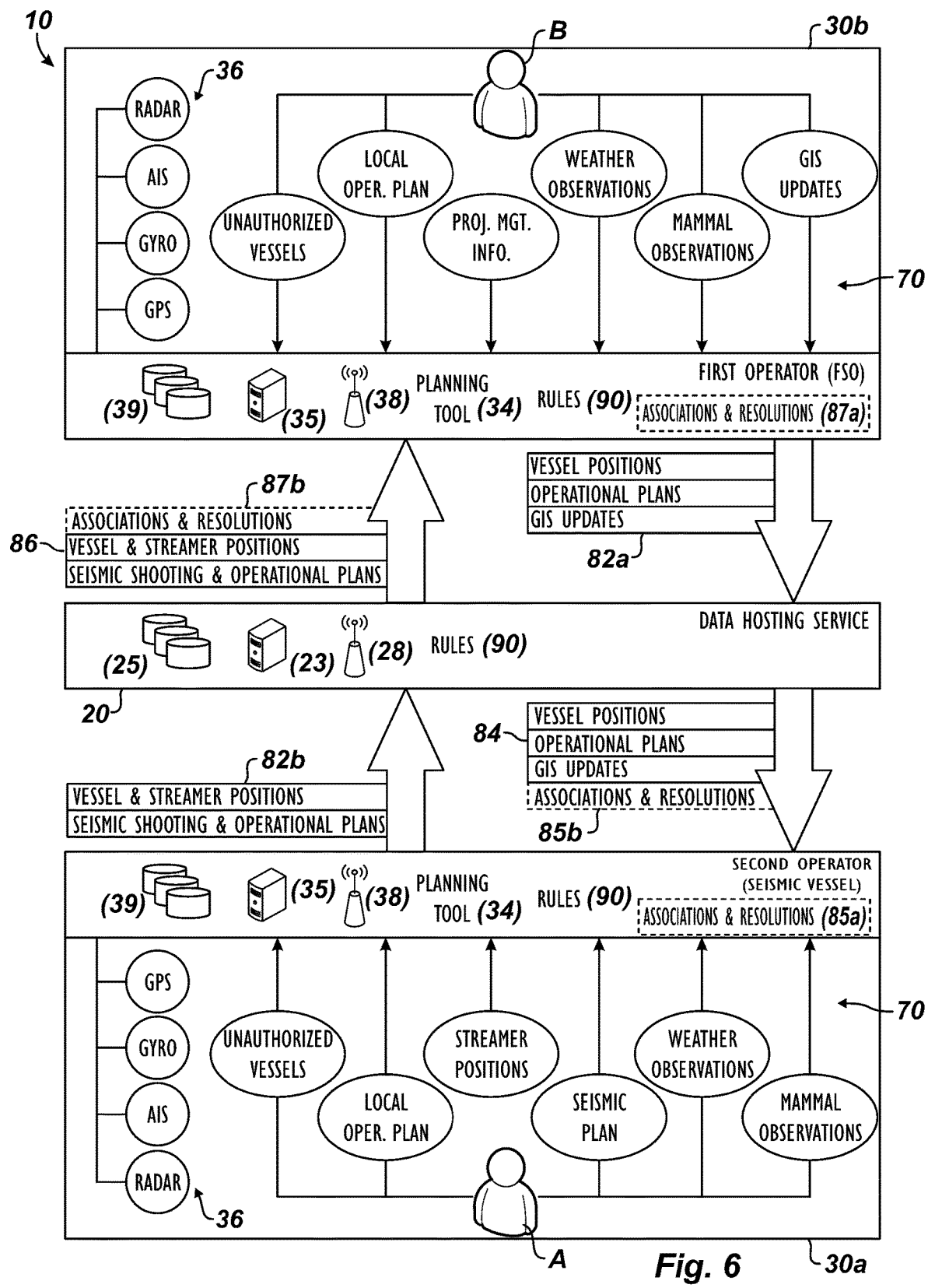
FIG. 6 schematically illustrates features of operators interfacing with the host service of the disclosed coordination system.

One particular example of different operators 30a-b interacting with the host services 20 is illustrated in FIG. 6, which can help show the sharing and coordination of information as disclosed herein. As noted above, the host service 20 is a network server system having network communication equipment 28 that obtains operational information associated with the dissimilar operations conducted by the dissimilar operators 30a-b in the same marine field (12). Memory stores the obtained operational information in the database system 25. Processing equipment, such as one or more servers 23, is operatively coupled to the network communication equipment 28 and the database system 25.

The processing equipment 23 is configured to perform the coordination services disclosed herein to provide a common operational picture across operators 30, companies, networks, etc. The host service 20 in a sense acts as middleman, connecting operators 30a-b and system users from different companies and networks. This can improve the visibility of the dissimilar operations across the marine field.

Aspects of the coordination services are also performed at network devices (e.g., computer system 35) of the operators 30a-b. As shown in the example of FIG. 6, a first operator 30a is a floating storage unit (FSO), while a second operator 30b is a seismic vessel. System users A at the FSO operator 30a interact with the planning tool 34 operating on the computer system 35 to input operational information 70, such as unauthorized vessel observations, local operation plans (tasks, positions, times, etc.), project management information, weather observations, mammal observations, GIS updates, etc. Various information from sensing equipment 36 (e.g., GPS, GYRO, AIS, RADAR) can also be input into the planning tool 34 as part of the operational information. The operational information, which can be stored locally in the database 35, is then communicated by the communication equipment 38 to the host server 20 in one or more outgoing communications 82a. In sending its operational information, the operator's computer system 35 can send any rules 90 associated with its operation so the host service 20 can compare those rules 90 against the operational information of other operators 30.

At the same time, system users B at the seismic operator 30b interact with the planning tool 34 operating on the computer system 35 to input operational information 70, such as unauthorized vessel observations, local operation plans (tasks, positions, times, etc.), streamer positions, seismic plan, weather observations, mammal observations, etc. Again, various information from sensing equipment 36 (e.g., GPS, GYRO, AIS, RADAR) can also be input into the planning tool 34 as part of the operational information. Finally, the operational information, which can be stored locally in the database 35, and any rules 90 are then communicated by the communication equipment 38 to the host server 20 in one or more outgoing communications 82b.

Using its communication equipment 28, the host service 20 receives the one or more outgoing communications 82a-b from the operators 30a-b. The operational information from the communications 82a-b is stored in the database system 25, and the processing equipment 23 of the host service 20 processes the operational information as disclosed herein based on rules and other parameters 90. Essentially, the host service 20 monitors the first operation(s) associated with the FSO operator 30a in relation to the dissimilar operation(s) associated with the seismic operators 30b in the same marine field 12, as well as other possible operators 30.

After the host service 20 does its processing, it shares the operational information in one or more communications 84, 86 to the operators 30a-b. The communication equipment 38 at the operators 30a-b receive the incoming communications 84, 86, and the planning tools 34 coordinate this information with the existing operational plans and other information for the operators 30a-b. As noted above, the host services 20 may be active or passive in determining associations, resolutions, and the like. In embodiments where the host service 20 is more active, the host service 20 can determine associations and/or resolutions and can send them 85b, 87b in its communications 84, 86 to the operators 30a-b. By contrast, in embodiments where the host service 20 is more passive, the host service 20 may not determine associations and/or resolutions so they 85b, 87b are not sent in its communications 84, 86 to the operators 30a-b. Instead, each operator 30a-b determines the requisite associations and/or resolutions 85a, 87b so users at the operators 30a-b can modify plans, make changes, and the like. These changes can in turn be communicated back to the host service 20 in the communications 82a-b from the operators 30a-b to the host service 20 so the host service 20 can then provide that information back to the various operators 30a-b as needed.

The operators' computer systems 35 displays the information, associations (linkages, conflicts, etc.), and the like in the planning tools 34 so that the system users A-B can assess the information, associations, threats, etc. and make necessary adjustment, changes, modifications, and the like to the current operational plans. Ultimately, the planning tools 34 at the operators 30a-b obtain one or more changes to the operational information, and these changes can be communicated in one or more outgoing communications 82a-b to the host service 20 for continued coordination.

As noted above, the host service 20 can determine resolutions to conflicts and can send those to the operator's computer system 35 for selection. Alternatively, the planning tool 34 at an operator 30 may determine resolutions to conflicts. This can involve prioritizing any resolutions to the conflict based on one or more rules 90 (either dictated from obtained information or from rules 90 at the operator 30a-b). These rules 90 can seek to minimize further conflicts, minimize operational cost, minimize operational impact, etc. The resolutions can be determined in view of downstream consequences for each of the resolutions to the obtained associations. In the end, the computer systems 35 at the operators 30a-b can obtain a selection of one of the resolutions and can send the selection to the host service 20.

H. Planning Tool and Graphical User Interfaces

As noted previously, the system 10 includes planning tools 34 having graphical user interfaces for users to visualize and manipulate plans, tasks, and other operational details for operators 30. The planning tool 34 is used on a network device or computer system 35 at the operator 30 and communicates with the host service 20. Changes made to tasks with the planning tool 34 at the operator 30 are shared with other operators 30 via the host service 20 and illustrated in the interface at the other operators 30, therefore allowing the other operators 30 to make their own respective operational changes in response.

Figure 7A:
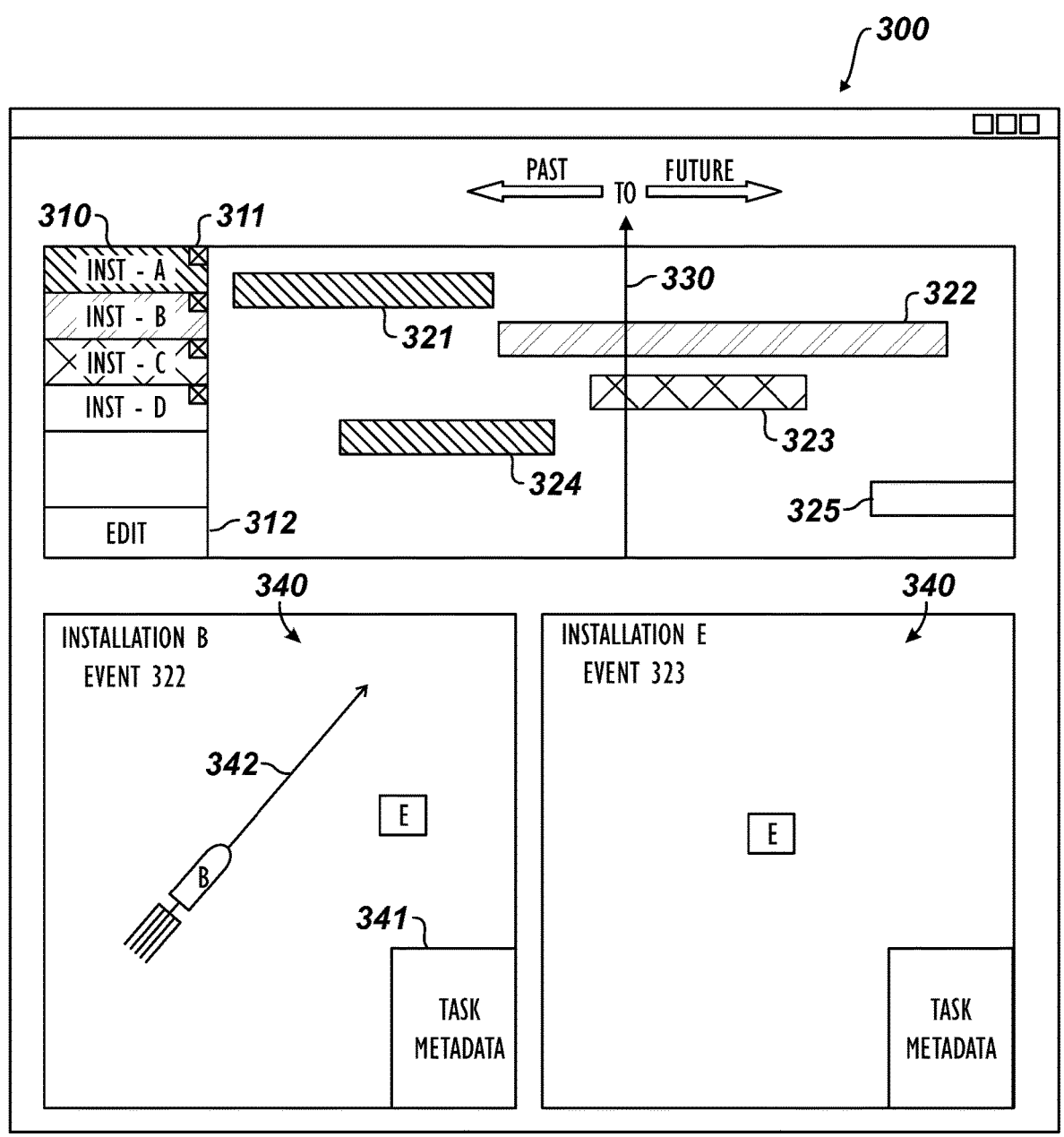
FIGS. 7A-7B illustrate example user interface screens for the disclosed system.

Accordingly, the disclosed system 10 has the operations planning tool 34 that can assist with operational decisions regarding one or more operators 30 requiring situational awareness. FIG. 7A illustrates an exemplary graphical user interface (GUI) 300 that can be presented on a display by the operations planning tool (34). The GUI 300 can include an installation or operator list 310, an operations planning calendar 320, and one or more display panels or windows 340 (two such display panels are shown in FIG. 7A). The operator list 310 can identify one or more operators, installations, vessels, or items of interest. For example, the operator list 310 illustrates a list including operators A, B, E, and D. The term operator is defined herein as any object, structure, installation, vessel, location, or the like, that can have an associated computer system configured to maintain a calendar of events associated with the operator. Examples of operators can include marine operators, oil rigs, seismic survey vessels, aircraft, remotely operated vehicles, marine vessels, fixed offshore structures, support vessels, tankers, offices, all classes of vehicles, or the like.

A user can be allowed to edit the operator list 310. For example, a close button 311 can be associated with each of the operators in the operator list 310. Clicking the close button can remove the operator from the operator list 310. An edit button 312 can be provided that can generate a separate GUI screen 300 that can allow the user to create a custom operator or view and select from a predefined list of available operators which can be added to the operator list 310.

The operations calendar 320 can display events that can be associated with one or more operators in the operator list 310. The events can be displayed as a Gantt chart, as shown. The construction of Gantt charts, including establishing priority and sequencing of event elements, is known in the art and not detailed here. In one embodiment, each of the events in the calendar 320 can be identifiable as being associated with a particular operator. For example, the operator identified in the operator list 310 and its associated events in the calendar 320 can have similar shading, color, or the like to visually associate the events with the operator. The events 321 and 324 can be associated with operator A, event 322 can be associated with operator B, and events 323 and 325 can be associated with operator E.

The user can be allowed to select particular one or more operators from the operators list 310, which can result in only the events associated with the selected operators being displayed in the calendar 320. Selection of particular operators from the operator list 310 can be accomplished by means of button clicks, radio buttons, check boxes, or any other reasonable means of selection.

The events illustrated in the calendar 320 can include a wide variety of tasks and events. Metadata regarding the events can be displayed in the calendar 320. Exemplary metadata can include, but is not limited to, name and description of the task, hierarchical task execution and approval requirements, responsible parties and their contact details, operator name and identifier, planned start dates, end dates, expected duration, location, known hazards or other zones, resource requirements, and the like. In one embodiment, events related to seismic surveys can include data such as planned acquisition paths and turn paths of survey vessels. Events can also include weather events such as location and predicted path of weather systems, predicted location and paths of objects such as icebergs, flotsam and jetsam or of marine wildlife, projected paths of vessels/vehicles, projected paths/locations of towed equipment, exclusion areas for operations, and the like.

The GUI 300 can provide a time slider 330 in the operations calendar 320. The time slider 330 can be configured to highlight events that can be active at a given point in time or within a given time frame. In one embodiment, the time slider 330 can be configured to highlight events that have occurred in the past, current events, as well as events that are planned or anticipated in the future. For example, the time slider 330 is positioned at $T_0$ (current time). The time slider 330 can be dragged to the left or the right to highlight events in the past, present or future, respectively.

The events selected by the time slider 330 can be displayed in greater detail in the display panels 330. For example, at time $T_0$, events 322 and 323 can be active. Accordingly, a display panel 340 can be generated for each of the events 322 and 323. In an alternative embodiment, the time slider 330 can simply highlight or otherwise identify active events at the selected time. Thereafter, the user can be allowed to click on one or more of the active events in the calendar 320 to generate a respective display window with event details.

Each display panel 340 can display metadata related to the one or more operators. Accordingly, the display panel 340 can display events that are associated with the respective one or more operators. The user can be provided with graphical tools to select one or more operators so that events associated with those selected operators are displayed in the panel 340 under the control of the time slider 330. Some types of metadata, for example, task name, persons responsible, start time, end time, duration, and the like associated with the one or more operators can be displayed in a metadata section 341 in the display panel 340.

Other metadata related to the operator can be visually presented, for example, current location, expected path of movement, size and shape of operators and the like can be represented with graphics in a map view. For example, the event 322 can be associated with operator B that can be a seismic data acquisition vessel and the related towed array of seismic streamers and equipment. The event 322 can define an acquisition line for seismic data acquisition. Accordingly, the current location of the operator B and the predicted size and path 342 can be depicted on a map in the panel 340 for event 322. In one embodiment, the display panel 340 can include graphical tools to select specific types of events that should be displayed on the display screen.

As noted above with reference to FIGS. 2, 3A-3B, 6, etc., each operator 30 can maintain an operations planning tool 34 in a computer system 35 at the operator 30. Each operator 30 can also allow users to modify tasks/events associated with the operator. Modifications to tasks/events made at one particular operator 30 can be broadcast to one or more other associated operators 30. Therefore, users at the other operators 30 can have an up-to-date version of the events in their respective operations planning tools.

For example, suppose the GUI 300 in FIG. 7A is generated by a computer system at operator A. A user associated with operator A can modify the event 321 associated with operator A. The modification to the event 321 can be broadcast to other operators, e.g., the operators B, E, and D. The operations planning tools at operators B, E, and D can therefore be configured to automatically update information and display the modified version of task 321 in respective GUIs.

As noted above with reference to FIGS. 2, 3A-3B, 6, etc., updating modifications to tasks between various operators 30 can be managed by the centralized computing system or host service 20 configured to receive task updates from each operator 30 and broadcast the task updates to all or selected relevant operators 30. In an alternative embodiment, users at a particular operator 30 can be allowed to configure their respective operations management tools to receive updates from selected operators 30. Therefore, operators 30 that have a predefined association can be configured to share updates to their respective tasks.

As noted above, some events can be dynamically updated via external sources 60. For example, a weather forecast/update can be periodically received by the operator's planning tool 34. In response to receiving the forecast one or more events, e.g., location and path of a weather system (such as a hurricane, typhoon, ice floe, storm system or other natural weather phenomena) can be dynamically updated. The updated task can be broadcast to other operators 30 that have not received the weather update.

The operations planning tool 34 can be configured to assist a user creating a new task/event at an operator 30. For example, the operations planning tool 34 can be configured to analyze previous tasks similar to a task that a user is attempting to create, and can suggest definitions/metadata for the task based on prior history. The prior history examined can include prior history from the same operator 30 as well as other associated operators 30.

Figure 7B:
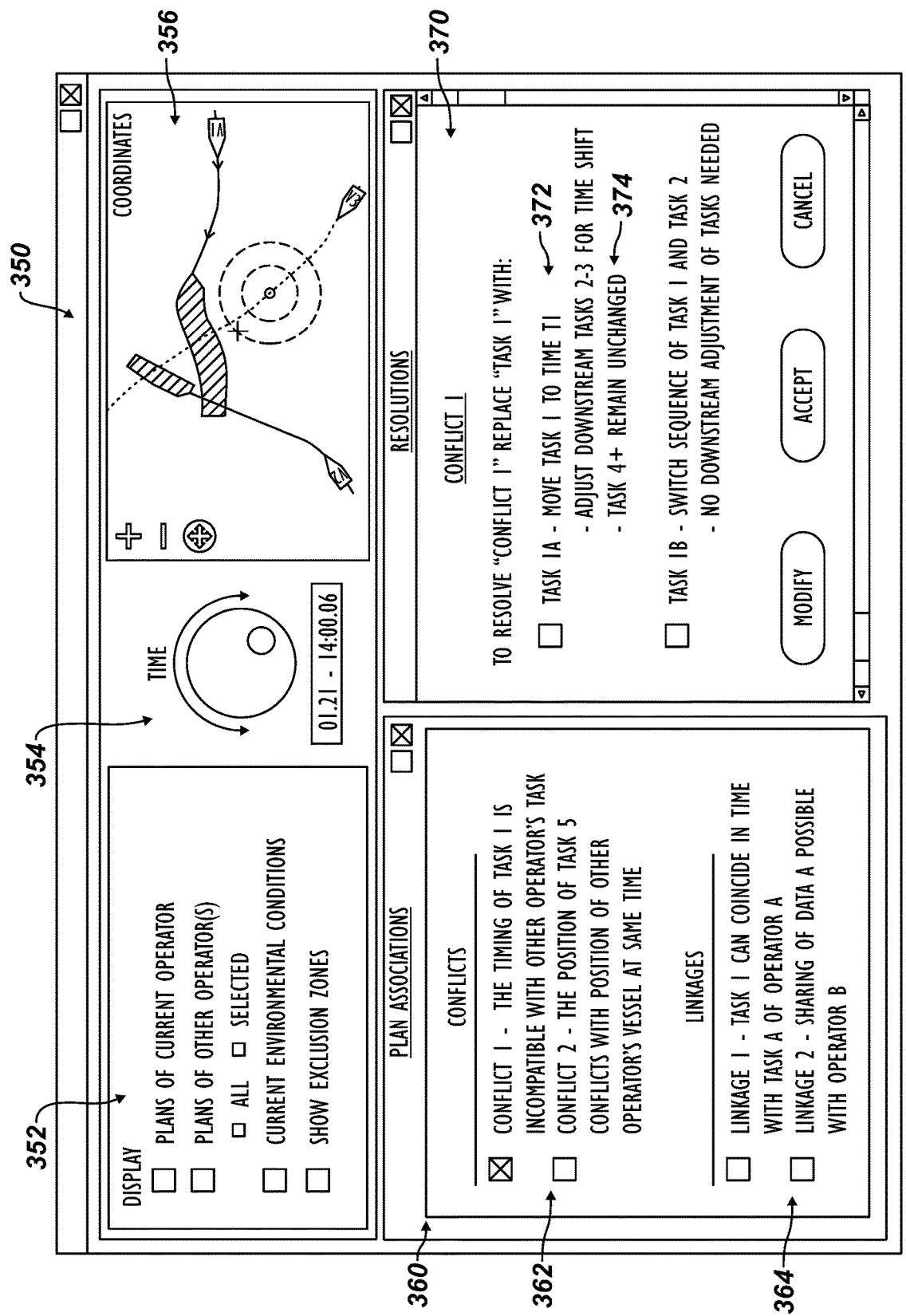

Each of these above features can be incorporated into a user interface. For instance, FIG. 7B shows another example user interface screen 350. As noted above, the system (10) can determine linkages and conflicts in the operations plans for the various operators (30) in the marine field (12). These can be configured at the central host service (20) or at the computer system of the operator (30). Either way, the computer system (35) of the operator (30) can have a user interface as shown that provides details of the plan associations 360 (conflicts 362 and linkages 364). The information can be display textually with descriptions. In a conflict 362, for example, the timing of one task may be incompatible with another operator's task, or the position of the operator's task may conflict with the position of another operator's vessel at the same time. These and similar details can be provided in the screen 350.

In a linkage 364, for example, one of the operator's tasks may be able to coincide in time with another operator's task as this may make the operations more efficient or may conserve time or space in the marine field (12). One particular example of this involves the simultaneous sharing of seismic source signals during seismic acquisition operations. In this regard, one seismic operator (30) may provide seismic source signals with air guns or the like as the operator (30) acquires seismic signals. Another seismic operator (30) can then share those source signals as this other operator (30) performs its own seismic acquisition. Alternatively, data from one of the operator's tasks can be shared with another operator (30) to prevent the need of obtaining duplicative data.

Information of the conflicts 362 and linkages 364 can also be displayed spatially with one or more maps in a map field 356. In general, the map field 356 can show operators (30), satellite data, ice obstacles, radar targets, beacons, vessels, and other elements of the system (10). Attributes of the various elements can also be viewed, and multiple displays can be configured. As before, a time slider 354 can be used to display the plans in the spatial map 356 at configurable times. The display of information can also be selectively configured using configuration choices 352.

As noted above, the host service (20) or operators (30) can determine resolutions to associations (linkages and conflicts). To that end, a section 370 for resolutions can be displayed for the operators (30) to select resolutions for the various conflicts 362 and linkages 364 that may be provided. Different resolutions 372 may be provided along with information about downstream consequences 374 of selecting a given resolution 372. In general, any resolutions can be automatically implemented when selected or may require manual implementation, and the way a given resolution is implemented can be weighted and determined. For instance, generally simpler or more routine resolutions may be implemented automatically when selected, whereas more complex resolutions may require some manual implementation by system users.

In one resolution 372, for example, the operators (30) may need to replace a given task with a modified task that resolves a conflict or achieves a linkage with some other operational plan. This may require further downstream adjustments 374 to be made, which the system (10) can then automatically or manually resolve.

Some examples of the user interface screens 300, 350 for the disclosed system (10) have been described with reference to FIGS. 7A-7B. These user interface screens 300, 350 can be part of the planning tools (34) operating on the system's architecture (10) on the operators (30) so operators (30) can review information, configure the system (10), track and monitor operations, threats, and the like, and plan tasks and other activities in response.

System operators (30) use these various user interface screens 300, 350 as well as others not detailed herein to visualize the surrounding environment. In the example user interface screen 350 of FIG. 7B, for example, the viewing area can have a map 356 of the region around an operator (30), which is shown as an icon overlaid on the map 356. For its part, the map 356 of the region of interest can be updated, zoomed in and out of, and otherwise manipulated by system users. Of course, the viewing area of the user interface screens 300, 350 can have more than one spatial display, and additional display areas can be manually added and then docked. Moreover, each display can be individually configured.

Embodiments of the disclosed subject matter are not limited by the specific elements of the graphical user interfaces to facilitate user input that are described herein. Any one or more of buttons, check boxes, radio buttons, drop down lists, text boxes, and the like can be used to facilitate user interaction with the user interfaces.

I. Computer System

Figure 8:
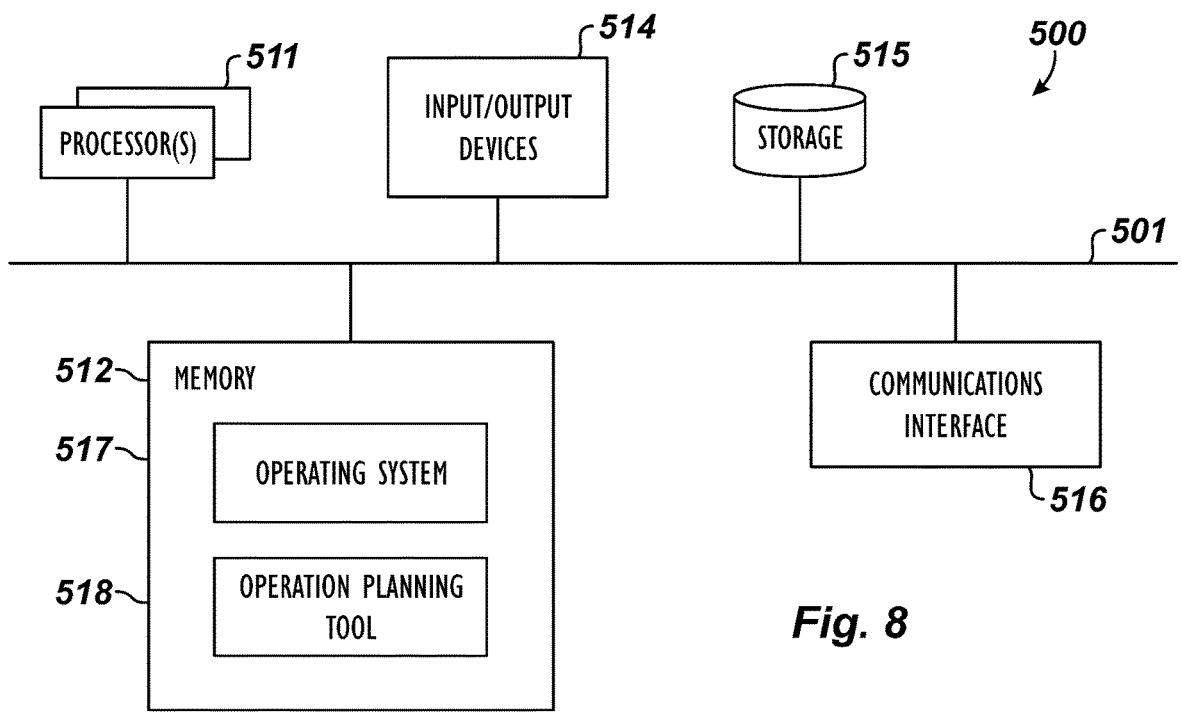
FIG. 8 schematically illustrates a computer system or network device for the disclosed system.

FIG. 8 illustrates an exemplary network device or computer system 500 according to an embodiment of the present disclosure. The computer system 500 may be implemented at an operator (30). Alternatively, the computer system 500 may be a centralized computer system configured to manage operations of a plurality of operators (30), such as used for the host service (20).

As illustrated in FIG. 8, the computer system 500 can include one or more processors 511, memory 512, input/output devices 514, storage 515, and a communications interface 516 connected via a communication bus 501.

The input/output devices 514 may include input devices such as a mouse, keyboard, touchscreens, and the like, and output devices such as CRT monitors, LCD displays, tablet computers, and the like. Storage device 515 stores application programs and data for use by the computer system 500. Typical storage devices include hard-disk drives, flash memory devices, optical media, network and virtual storage devices, and the like. The communications interface 516 may connect the computer system 500 to any kind of data communications network, including either wired networks, wireless networks, or a combination thereof. In one embodiment, the communications interface 516 may be utilized to broadcast/receive event updates to one or more installations, receive weather data, and the like.

The memory 512 is preferably a random access memory sufficiently large to hold the necessary programming and data structures of the disclosed subject matter. While memory 512 is shown as a single entity, it should be understood that memory 512 may in fact comprise a plurality of modules, and that memory 512 may exist at multiple levels, from high speed registers and caches to lower speed but larger DRAM chips.

Illustratively, the memory 512 contains an operating system 517. Well known examples of operating systems include the Windows® operating system, distributions of the Linux® operating system, and IBM's AIX and OS/2® operating systems, among others. More generally, any operating system supporting the functions disclosed herein may be used.

Memory 512 is also shown containing an operations planning tool 518 which, when executed by the processor 511, provides support for generating the graphical user interfaces, such as the screens 300, 350 of FIGS. 7A-7B, facilitates user interaction with the user interfaces as described herein, and broadcasts/receives event updates as described herein.

In the preceding discussion, reference has been made to embodiments of the present disclosure. However, it should be understood that the disclosed subject matter is not limited to specific described embodiments. Instead, any combination of the disclosed features and elements, whether related to different embodiments or not, is contemplated to implement and practice the disclosed subject matter. Furthermore, in various embodiments the disclosed subject matter provides numerous advantages over the prior art. However, although embodiments of the disclosed subject matter may achieve advantages over other possible solutions and/or over the prior art, whether or not a particular advantage is achieved by a given embodiment is not limiting of the disclosed subject matter. Thus, the various aspects, features, embodiments and advantages are merely illustrative and are not considered elements or limitations of the appended claims except where explicitly recited in a claim(s). Likewise, reference to "the disclosed subject matter" shall not be construed as a generalization of any inventive subject matter disclosed herein and shall not be considered to be an element or limitation of the appended claims except where explicitly recited in a claim(s).

In one embodiment, the disclosed subject matter can be implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present disclosed subject matter, represent embodiments of the present disclosed subject matter.

In general, the routines executed to implement the embodiments of the disclosed subject matter, may be part of an operating system or a specific application, component, program, module, object, or sequence of instructions. The computer program of the present disclosure typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the disclosed subject matter. However, it should be appreciated that any particular program nomenclature that follows is used merely for convenience, and thus the disclosed subject matter should not be limited to use solely in any specific application identified and/or implied by such nomenclature.

While the foregoing is directed to embodiments of the present disclosure, other and further embodiments of the present disclosure may be devised without departing from the basic scope thereof, and the scope thereof is determined by the claims that follow. For example, embodiments of the disclosed subject matter are described herein with respect to oil and gas marine operations, particularly seismic data acquisition operations. However, embodiments of the disclosed subject matter may be utilized for operations planning in any industry, including but not limited to operations and logistics for installations related to ports, harbors, air traffic, airport ground traffic, cargo management, oil and gas land operations, construction, manufacturing and repair or maintenance.

Although only some user interface screens for the system 10 have been shown in FIGS. 7A-7B, it will be appreciated that the user interfaces and various modules of the system 10 can use a number of screens for entering, modifying, and displaying information. For example, a user interface screen may be provided that allows operators to relay and communicate instructions between vessels, maintain action items, modify or configure the system, and the like.

What is claimed is:

1. A method of coordinating a plurality of dissimilar marine operators performing dissimilar operations in at least one of exploration, drilling, and production of hydrocarbon in a same marine field, the method comprising:
obtaining operational information associated with the dissimilar operations conducted by the dissimilar marine operators in the same marine field;
determining, automatically in real-time with decision-making processing from the obtained operational information, at least one prospective resolution to at least one association between at least two of the dissimilar operations performed by at least two of the dissimilar marine operators;
generating spatial and temporal representations of at least the at least two dissimilar operations of the at least one association for real-time visual display;
obtaining a selection of the at least one prospective resolution by sharing the spatial and temporal representations along with the at least one prospective resolution with the at least two dissimilar marine operators of the at least one association; and
coordinating the at least two dissimilar operations between the at least two dissimilar marine operators in response to the obtained selection.

2. The method of claim 1, wherein determining the at least one prospective resolution to the at least one association comprises determining at least one linkage as the at least one association between compatible ones of the at least two dissimilar operations for the at least two dissimilar marine operators.

3. The method of claim 2, wherein obtaining the selection comprises obtaining, from at least one of the at least two dissimilar marine operators, a selection of at least one solution to the at least one linkage; and wherein coordinating the at least two dissimilar operations in response to the obtained selection comprises: resolving the least one linkage based on the at least one solution; and sharing information of the at least one resolved linkage with the at least two dissimilar marine operators.

4. The method of claim 2, wherein determining the at least one linkage comprises determining that the obtained operational information for the at least two dissimilar operations occurs in a compatible fashion.

5. The method of claim 4, wherein determining that the obtained operational information occurs in the compatible fashion comprises determining that the obtained operational information coincides in one or more of space, time, and sequence without violating an exclusionary rule in the decision-making processing.

6. The method of claim 2, wherein determining the at least one prospective resolution to the at least one association comprises determining at least one linking resolution as the at least one prospective resolution linking the compatible ones of the at least two dissimilar operations by considering consequences to other of the dissimilar operations downstream of the at least one linking resolution.

7. The method of claim 6, wherein determining the at least one linking resolution comprises determining the downstream consequences to other of the dissimilar operations for each of a plurality of the at least one linking resolution.

8. The method of claim 1, wherein determining the at least one prospective resolution to the at least one association comprises determining at least one conflict as the at least one association between incompatible ones of the at least two dissimilar operations for the at least two dissimilar marine operators.

9. The method of claim 8, wherein obtaining the selection comprises obtaining, from at least one of the at least two dissimilar marine operators, a selection of at least one solution to the at least one conflict; and wherein coordinating the at least two dissimilar operations in response to the obtained selection comprises: resolving the least one conflict based on the at least one solution; and sharing information of the resolved conflict with the at least two dissimilar marine operators.

10. The method of claim 8, wherein determining the at least one conflict comprises determining that the obtained operational information for the at least two dissimilar operations of the at least two dissimilar marine operators occurs in an incompatible fashion.

11. The method of claim 10, wherein determining that the obtained operational information occurs in the incompatible fashion comprises determining that any one or more of task information, position information, and time information of the obtained operational information violates at least one rule in the decision-making processing.

12. The method of claim 8, wherein determining the at least one prospective resolution comprises determining at least one conflict resolution as the prospective resolution reconciling conflict between the incompatible ones of the at least two dissimilar operations by considering consequences to other of the dissimilar operations downstream of the at least one conflict resolution.

13. The method of claim 12, wherein determining the at least one conflict resolution comprises determining the downstream consequences for each of a plurality of the at least one conflict resolution.

14. The method of claim 1, wherein obtaining the operational information comprises one or more of:
relationally aggregating together one or more of task information, position information, and time information of the dissimilar operations for the dissimilar marine operators;
arranging the obtained operational information in one or more spatial representations, temporal representations, relationships between the dissimilar operations, and/or relationships between the dissimilar marine operators for sharing; and
monitoring current operational conditions of the dissimilar operations conducted dynamically in real-time by the dissimilar marine operators in the same marine field.

15. The method of claim 1, wherein generating the spatial and temporal representations comprises generating the spatial and temporal representations for each of the dissimilar operations; and wherein sharing the spatial and temporal representations comprises sharing the spatial and temporal representations to each of the dissimilar marine operators.

16. The method of claim 1, wherein sharing the spatial and temporal representations along with the at least one prospective resolution comprises sharing the spatial and temporal representations of the at least two dissimilar operations in past, present, and future time frames for real-time visual display in a user interface.

17. The method of claim 16, wherein sharing the spatial and temporal representations of the at least two dissimilar operations in past, present, and future time frames for real-time visual display in the user interface comprises allowing a user to select the spatial and temporal representations for visual display at a selected point in time or within a selected time frame in the past, present, or future by providing a time slider control operable by the user in the user interface.

18. The method of claim 1, further comprising:
monitoring at least one environmental condition dynamically in real-time in the same marine field; and
predicting at least one change in the at least one environmental condition based on the monitoring,
wherein the acts of determining and sharing further comprise updating the determining and the sharing in real-time in light of the at least one predicted change.

19. A programmable storage device having program instructions stored thereon for causing a programmable control device to perform a method of coordinating a plurality of dissimilar marine operators performing dissimilar operations in at least one of exploration, drilling, and production of hydrocarbon in a same marine field, the method comprising:
obtaining operational information associated with the dissimilar operations conducted by the dissimilar marine operators in the same marine field;
determining, automatically in real-time with decision-making processing from the obtained operational information, at least one prospective resolution to at least one association between at least two of the dissimilar operations performed by at least two of the dissimilar marine operators;
generating spatial and temporal representations of at least the at least two dissimilar operations of the at least one association for real-time visual display;
obtaining a selection of the at least one prospective resolution by sharing the spatial and temporal representations along with the at least one prospective resolution with the at least two dissimilar marine operators of the at least one association; and
coordinating the at least two dissimilar operations between the at least two dissimilar marine operators in response to the obtained selection.

20. A system for coordinating dissimilar operations in at least one of exploration, drilling, and production of hydrocarbon conducted by a plurality of dissimilar marine operators in a same marine field, the system comprising:
network communication equipment obtaining operational information associated with the dissimilar operations conducted by the dissimilar marine operators in the same marine field;
memory storing the obtained operational information; and
processing equipment operatively coupled to the network communication equipment and the memory, the processing equipment being configured to:
determine, automatically in real-time with decision-making processing from the obtained operational information, at least one prospective resolution to at least one association between at least two of the dissimilar operations performed by at least two of the dissimilar marine operators;
generate spatial and temporal representations of at least the at least two dissimilar operations of the at least one association for real-time visual display;
share the spatial and temporal representations along with the at least one prospective resolution with the at least two dissimilar marine operators of the at least one association to obtain a selection of the at least one prospective resolution; and
coordinate the at least two dissimilar operations between the at least two dissimilar marine operators in response to the obtained selection.

* * * * *